United States Patent [19]

Pirz et al.

[11] E Patent Number: Re. 32,012

[45] Reissued Date of Patent: Oct. 22, 1985

[54] SPOKEN WORD CONTROLLED AUTOMATIC DIALER

[75] Inventors: Frank C. Pirz, Madison; Lawrence R. Rabiner; Aaron E. Rosenberg, both of Berkeley Heights; Jay G. Wilpon, Warren, all of N.J.

[73] Assignee: AT&T Bell Laboratories, Murray Hill, N.J.

[21] Appl. No.: 648,691

[22] Filed: Sep. 7, 1984

Related U.S. Patent Documents

Reissue of:

[64] Patent No.: 4,348,550
Issued: Sep. 7, 1982
Appl. No.: 128,842
Filed: Mar. 10, 1980

[51] Int. Cl.[4] ..... G10L 1/00

[52] U.S. Cl. ..... 381/43; 381/51; 364/513.5; 179/90 B; 381/110

[58] Field of Search ..... 381/43, 44, 51-53, 381/110; 179/90 B, 90 BB, 90 BD, 2 DP, 18 B, 18 BA; 382/33, 34, 37

[56] References Cited

U.S. PATENT DOCUMENTS

| | | | |
|---|---|---|---|
| 3,612,766 | 10/1971 | Ferguson | 179/1 HF |
| 3,742,143 | 6/1973 | Awipi | 179/1 SA |
| 4,027,284 | 5/1977 | Hoshino et al. | 340/146.3 AQ |
| 4,243,845 | 1/1981 | Feinberg et al. | 179/90 B |

OTHER PUBLICATIONS

Flanagan, J., "Computers That Talk and Listen", IEEE Proceedings, Apr. 1976, pp. 405-415.

Kitsopoulos, S. et al., "Experimental Telephone etc.", Bell Labs Record (USA) vol. 51, No. 9, Oct. 1973, pp. 272-277.

Baker, J., "The Dragon System-An Overview", IEEE Trans. on Acoustics, Speech and Sig. Proc., Feb. 1975, pp. 24-29.

*Primary Examiner*—E. S. Matt Kemeny
*Attorney, Agent, or Firm*—Jack S. Cubert

[57] ABSTRACT

A speech controlled dialing circuit identifies input utterances which may be a command word (mode select), repertory word (dialing name or number), or nonrecognized ("Other"). Responsive to the identification of each occurring input utterance, a set of predetermined templates are selected to identify the next occuring utterance. A programmed microprocessor system is described to implement the main controller function.

18 Claims, 14 Drawing Figures

DIRECTORY STORE 170
DIALER PULSE FORMER 160
CONTROLLER 150
WORD RECOGNIZER 130
TEMPLATE MEMORY 120
TEMPLATE CONTROL LOGIC 140
SPEECH ANALYZER 110
VOICE RESPONSE CIRCUIT 180
RST
DRW
DA
DC
DSD
DPC
195
WC
TMAX
WRD
SA
TIN
SYT
RTN
TRW
CM
RL
AE
FR
TN
TF
SK
UF
F1
SP
Un
REC
EM
VRD
101
190

| | STATE | 20-T MAX NAMES |
|---|---|---|
| CM | RES | 0 |
| | DIA | 1 |
| | VER | 0 |
| | NAM | 1 |
| | CALL | 0 |
| | NUM | 0 |
| | DIR | 0 |

TEMPLATE CONTROL LOGIC 140

VOICE RESPONSE CCT 180

WORD RECOGNIZER 130

| | | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| | STATE \ UTTERANCE | OFF HOOK | DIRECTORY | TRAIN | ADD | DELETE | MODIFY | STOP | ERROR | HANGUP | ZERO | ONE | TWO | THREE | FOUR | FIVE | SIX | SEVEN | EIGHT | NINE |
| CM | RES | 1 | 1 | 1 | 0 | 0 | 0 | 0 | 0 | 0 | 0 | 0 | 0 | 0 | 0 | 0 | 0 | 0 | 0 | 0 |
| | DIA | 0 | 0 | 0 | 0 | 0 | 0 | 1 | 0 | 0 | 1 | 1 | 1 | 1 | 1 | 1 | 1 | 1 | 1 | 1 |
| | VER | 0 | 0 | 0 | 0 | 0 | 0 | 1 | 1 | 0 | 0 | 0 | 0 | 0 | 0 | 0 | 0 | 0 | 0 | 0 |
| | NAME | 0 | 0 | 0 | 0 | 0 | 0 | 1 | 0 | 0 | 0 | 0 | 0 | 0 | 0 | 0 | 0 | 0 | 0 | 0 |
| | CALL | 0 | 0 | 0 | 0 | 0 | 0 | 0 | 0 | 1 | 0 | 0 | 0 | 0 | 0 | 0 | 0 | 0 | 0 | 0 |
| | NUM | 0 | 0 | 0 | 0 | 0 | 0 | 1 | 0 | 0 | 1 | 1 | 1 | 1 | 1 | 1 | 1 | 1 | 1 | 1 |
| | DIR | 0 | 0 | 0 | 1 | 1 | 1 | 1 | 0 | 0 | 0 | 0 | 0 | 0 | 0 | 0 | 0 | 0 | 0 | 0 |

| FIG. 8 | FIG. 9 |
|---|---|

TRAIN MODE

REST MODE

DIRECTORY (ADD) MODE

DIAL MODE

SPOKEN WORD CONTROLLED AUTOMATIC DIALER

Matter enclosed in heavy brackets [ ] appears in the original patent but forms no part of this reissue specification; matter printed in italics indicates the additions made by reissue.

TECHNICAL FIELD

Our invention relates to automatic dialing in communication systems and more particularly to speech controlled automatic dialing arrangements.

BACKGROUND OF THE INVENTION

Automatic and repertory dialing arrangements permit telephone system subscribers to access frequently called telephone numbers without time consuming and errorprone manual dialing. Such dialers find widespread use in the business environment where efficient utilization of telephone communication is economically important. Automatic and repertory dialing also permits handicapped persons who find it difficult or impossible to perform the manipulations required for manual dialing to use telephone communication without assistance.

While the number of manual operations needed to complete the dialing of a telephone number is significantly reduced in known repertory dialing systems, manual operations have not been eliminated. Some manipulation of the dialing apparatus is required for each call and additional manual processing is needed to insert or change the repertoire in the dialing device. It is desirable to design automatic and repertory dialers so that manual operations are completely eliminated. Speech recognition apparatus has been utilized to insert information into data processing equipment and to control mechanical devices without direct physical contact. Prior art speech recognizers, however, have been able to operate only with very restricted vocabularies.

U.S. Pat. No. 3,742,143 issued to M. Awipi on June 26, 1973 and assigned to the same assignee discloses a limited vocabulary speech recognition circuit for machine and telephone control in which an utterance is recognized as one of a limited set of vocabulary words. Detection of predetermined words may initiate telephone operations such as dialing. Awipi, however, requires each utterance to be recognized as one of the entire set of stored reference words. Any increase in the size of the stored reference words to incorporate an extensive list of names or additional commands substantially increases the difficulty of automatic recognition and reduces the accuracy of utterance recognition.

U.S. Pat. No. 4,164,025 issued to John J. Dubnowski and Aaron E. Rosenberg Aug. 7, 1979 and assigned to the same assignee discloses a spoken letter recognition arrangement designed to provide automatic directory assistance to subscribers over a telephone connection. This arrangement, however, requires spelled input in order to obtain a high degree of recognition accuracy. Other speech recognizers are similarly restricted in vocabulary for accurate recognition. The article "Computers that Talk and Listen: Man-Machine Communication by Voice" by J. L. Flanagan, Proceedings of the IEEE, Vol. 64, No. 4, April 1976, pp. 405–415 describes a recognition technique in which information is input to a computer via a man-machine dialog. A predetermined sequence of synthesized messages are generated. For each message, the recognition vocabulary is restricted to an answer ensemble appropriate to the synthesized message inquiry. These and other prior art recognizers are not adapted to automatic and repertory dialing wherein changing dialer vocabulary must conform to the user, an extended dialog is inefficient, and in which the error rate as well as the repeat dialing rate must be very low. For efficient operation, a spoken word recognizer is required to respond to any user utterance, to distinguish between speech meant to activate dialing and other speech and noise in factory, office, or home environments, and to accommodate a changing vocabulary of diverse names. It is an object of the invention to provide an improved automatic dialing arrangement which is controlled by spoken words.

BRIEF SUMMARY OF THE INVENTION

This invention is directed to a speech responsive automatic dialing circuit, in which templates representative of the acoustic features of command words and repertory reference words are stored. A directory stores a set of dialing signals corresponding to the repertory words. Responsive to each input utterance, a speech analyzer produces a signal representative of the acoustic features of the utterance. Jointly responsive to the stored template signals and the utterance acoustic features signal, a spoken word recognizer generates a signal identifying the input utterance. Upon the identification of an input utterance as one of the repertory words, the corresponding dialing signal is retrieved from the directory store. Responsive to the identification of an input utterance, a set of predetermined template signals are selected to identify the next occurring input utterance.

According to one aspect of the invention, a control signal corresponding to each utterance identifying signal is generated. Signals to address templates in the template memory are produced responsive to the next occurring input utterance. Jointly responsive to the utterance identifying control signal and the memory addressing signals, a predetermined set of template signals are applied to the spoken word recognizer.

According to another aspect of the invention, the template signals for all templates in the template memory are sequentially produced responsive to the next occurring utterance. A set of gating signals are stored for each utterance identifying control signal. The gating signal addressed by the control signal and each template signal is applied to the spoken word recognizer to gate only the predetermined template signals to the word recognizer.

According to yet another aspect of the invention, the speech analyzer is enabled for a preselected time interval responsive to each repertory word utterance identifying signal. A predetermined set of preselected time interval template signals are applied to the spoken word recognizer to identify the next occurring utterance. The dialing signal for the repertory word utterance identifying signal is outputted upon identification of the next occurring utterance as other than one of the predetermined set of the preselected time interval template signals.

According to yet another aspect of the invention, a first signal is generated responsive to each command word utterance identifying signal. Jointly responsive to the identification of the next occurring utterance as other than one of the predetermined template signals selected by the command word utterance identifying signal, said command word utterance predetermined template signals are selected to identify the utterance immediately succeeding said next occurring utterance.

According to yet another aspect of the invention, a set of isolated command word and repertory word template signals are produced responsive to a cued sequence of utterances by a speaker. The isolated word template signals are inserted in the template signal memory whereby the spoken word dialing is sensitive only to isolated utterances of these reference words.

In an embodiment illustrative of the invention, isolated word template signals for a set of command words and a set of repertory words are generated responsive to dialer cued utterances by a predetermined user. The dialer is then switched to a rest mode in which the spoken word recognizer is operative to recognize the next occurring utterance of the user as one of the first predetermined set of isolated command word templates, "off-hook," "train" or "directory." Detection of utterances of other speakers or conversational utterances of the user are effective to reset the dialer to recognize the succeeding utterance as one of the first predetermined set of template signals.

Recognition of an isolated user utterance as the command template "off-hook" switches the dialer to its dial mode and causes the word recognizer to recognize the next occurring utterance as only a repertory word template. The repertory word templates consist of repertory names or repertory number sequences. If "stop" is detected, the dialer is reset to recognize the succeeding utterance as one of the command words "off-hook," "train," or "directory." When a repertory name is recognized, the voice response circuit feeds back the name recognized to the user and enables the speech analyzer to receive a short preselected time interval utterance (e.g. 2 seconds). The speech recognizer is set to compare the short utterance to only templates for the short duration command words "stop," and "error".

Detection of other than the two short interval command words "error" or "stop" causes a dialing signal corresonding to the repertory name to be retrieved from a directory store. The dialing signal is then supplied to the user telephone line. Recognition of the short utterance as "error" resets the dialer to recognize the succeeding utterance as one of the repertory word templates. Detection of the shortened utterance as "stop" returns the dialer to its rest mode. After the dialing signal is obtained, the dialer is switched to its call state and the recognizer is conditioned to detect an input utterance as the isolated word template "hang up." Other utterances or "hang up" in conversational speech by the user resets the dialer to compare the succeeding utterance to the isolated "hang up" command template. Recognition of the isolated utterance "hang up" by the user terminates the call state and resets the dialer to its rest state.

DETAILED DESCRIPTION

Figure 1:
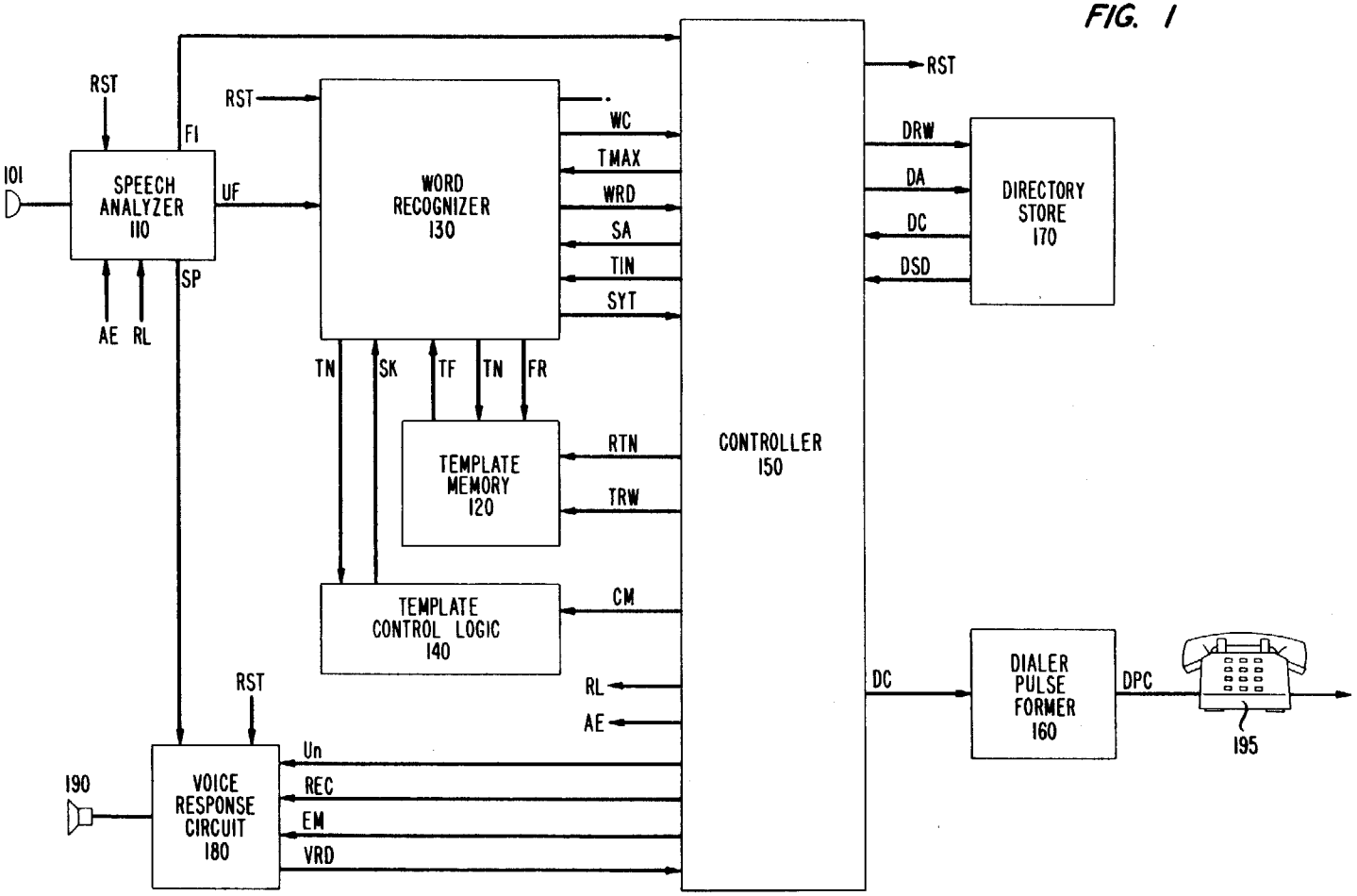
FIG. 1 depicts a general block diagram of a spoken word dialing system illustrative of the invention.

FIG. 1 depicts a general block diagram of a repertory dialer illustrative of the invention. In FIG. 1, speech analyzer 110 is operative to receive signals from microphone 101 and to generate a set of acoustic feature signals responsive to each utterance obtained from the microphone. As is well known in the art, speech analyzer 110 may be adapted to produce various types of utterance feature signals such as formant, spectral, or prediction analysis feature signals. Word recognizer 130 is jointly responsive to the acoustic feature signals from speech analyzer 110 and the sequence of acoustic features for reference words stored in template memory 120 to identify the input utterance.

Control unit 150 is connected to analyzer 110, word recognizer 130, and template logic 140. The controller is adapted to control the recognition process in accordance with a set of permanently stored instruction codes which instruction codes direct the various phases of the repertory dialer operation, Speech analyzer 110 and control 150 are connected to voice response circuit 180 so that the succession of identified utterances may be stored and retrieved from storage to produce speech waves via loud speaker unit 190. Controller 150 is also connected to directory store 170 which contains the dialing codes corresponding to the stored template signals in template memory 120 and is further connected to dialer 160 which dialer is adapted to provide dialing signal sequences corresponding to the codes from directory store 170.

Speech analyzer 110 is operative to receive electrical signals from microphone 101 and to transform said signals into utterance feature signals. In the circuit of FIG. 1, linear prediction analysis is preferred but spectral or other analysis arrangements may be used.

Template memory 120 contains acoustic feature templates corresponding to reference utterances previously applied by a user to speech analyzer 110. The reference utterances include a set of command words used to change the operating modes of the circuit of FIG. 1, a set of spoken name templates corresponding to other subscriber telephone stations to which access is desired and a set of spoken number templates for use in the construction of automatic dialing codes. The command word set includes templates for words such as "off-hook," "directory," "modify," "stop," "error," and "hang up." The acoustic feature templates in memory 120 are placed in sequential positions which are accessed responsive to signals from recognizer 130. While the templates may be placed in any order, it is preferable to place the set of command words in the first positions of memory 120. The spoken number template positions are located after the command word positions and the spoken name template positions follow the spoken number positions. The aforementioned order permits the addition of spoken name templates to memory 120 without alteration of the positions of previously recorded templates.

Figures 8, 14:
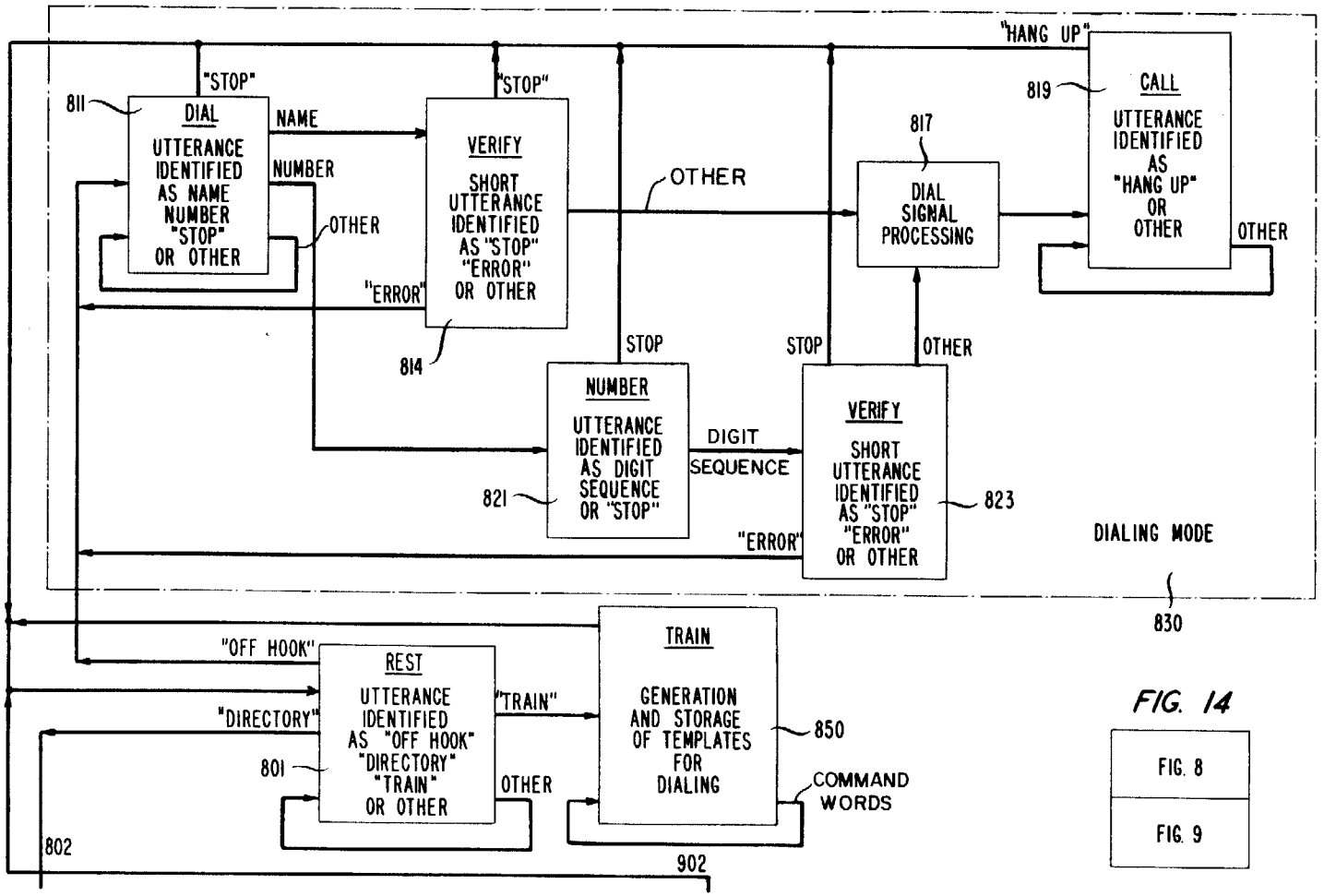
FIGS. 8 and 9 show a flow chart illustrative of the operation of the circuit of FIG. 1.
FIG. 14 shows the arrangement of FIGS. 8 and 9.
Figure 9:
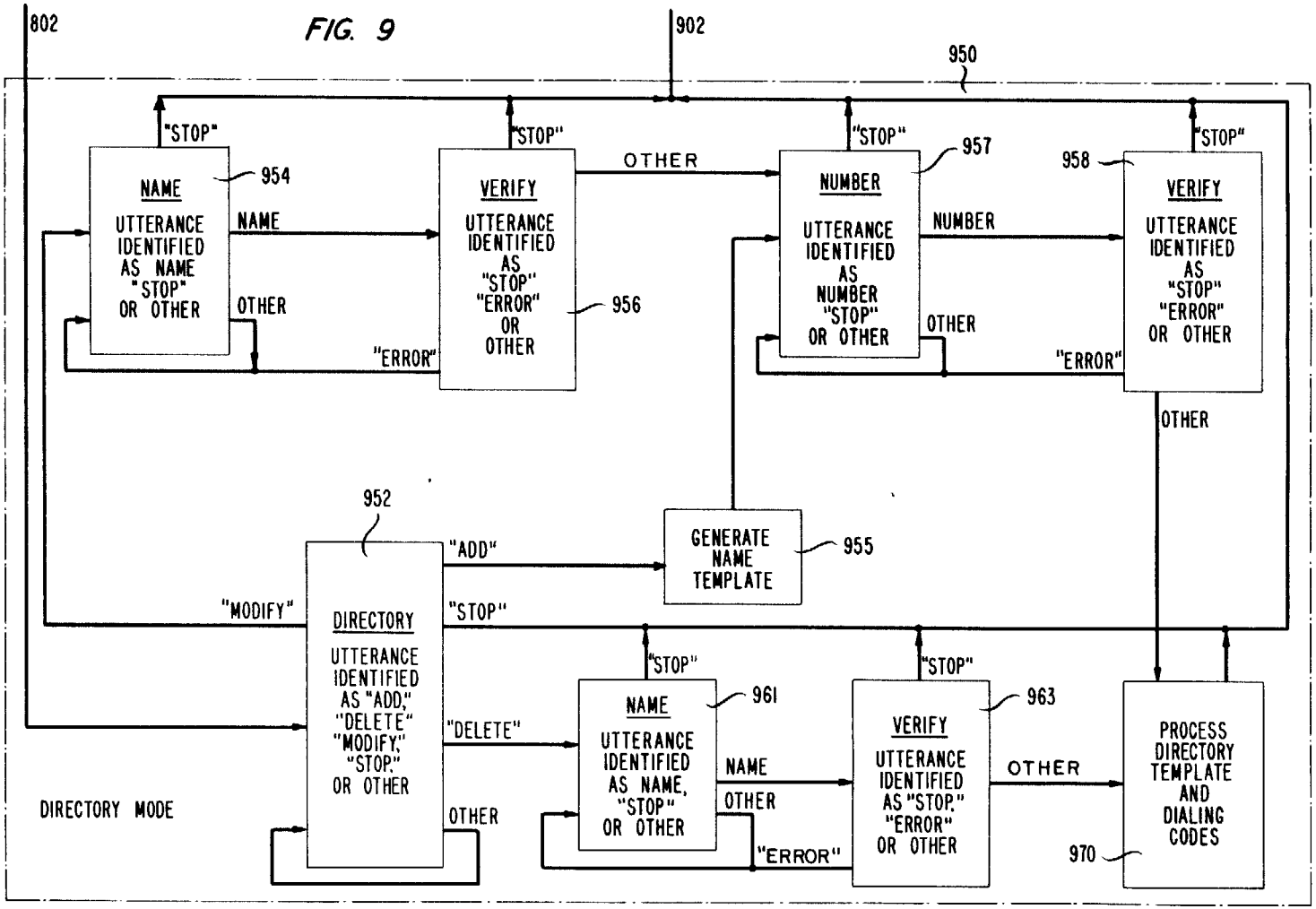

When not in use, the circuit of FIG. 1 is placed in its rest mode during which speech analyzer is adapted to accept utterances from microphone 101. Feature signals generated from the accepted utterances are compared to a restricted set of template signals from memory 120. The flow diagram of FIGS. 8 and 9 illustrate the general operation of the circuit of FIG. 1. As illustrated in box 801 of FIG. 8, the restricted set of template signals in the rest mode consists of templates for the command words "off-hook," "train," and "directory." Word recognizer 130 is operative to sequentially compare the template acoustic feature signals for the words of the restricted group to the acoustic features of the input utterance from analyzer 110. As a result of the comparisons between the input utterance and the selected set of templates, a coded identification signal WC is generated in recognizer 130 which signal identifies the input utterance as the closest corresponding template or indicates that none of the selected templates correspond to the input utterance acoustic features.

In the event the template "off-hook" is identified as the input utterance in the rest mode, controller 150 is switched to its dialing mode (box 830 of FIG. 8) during which a dialing sequence is permitted. Identification of the template "directory" switches controller 150 to its directory mode (box 950 of FIG. 9) during which additional names can be inserted into the dialing repertoire, modifications can be made to existing entries of the repertoire, or deletions can be made to the dialing repertoire. Recognition of the utterance as the template "train" causes controller 150 to assume its training mode state (box 850). The dialing arrangement of FIG. 1 then generates prescribed template signals from the cued utterances of a user so that it is adapted to recognize isolated word utterances of the user. Where other than these three templates is identified in recognizer 130 in the rest mode, the controller remains in its rest mode to process recognition of additional utterances as one of the predetermined set "off-hook," "directory," or "train."

The dialing mode is initiated by a WC signal from word recognizer 130 which corresponds to the spoken word "off-hook." In the initial phase of the dialing mode, speech analyzer 110 receives input utterance signals from microphone 101 and supplies feature signals for the utterances to word recognizer 130. Template control logic 140 is set by controller 150 to restrict the templates accessed from memory 120 to repertory number and repertory name templates as illustrated in box 811 of FIG. 8. Upon recognition of the utterance as a spoken digit, template control logic 140 is altered so that the next group of utterances is compared only to spoken digit templates from memory 120. Upon recognition of the last expected digit utterance, controller 120 signal voice response circuit 180 to generate the phrase "I have recognized the number" followed by the digit utterances just recognized. The resulting audio signal is sent to the user so that he may verify the recognized digits.

After the number is fed back to the user via voice response circuit 180, speech analyzer 110 is conditioned to receive a shortened utterance in a limited verification interval (box 823) which utterance may be "stop," "error" or other than these words. Control logic 140 signals word recognizer 130 to compare any input utterance during the prescribed verification period to the command words "stop," and "error."

In the event that the template for the command word "stop" is recognized by word recognizer 130, the "stop" WC identification code returned to controller 150 causes controller 150 to reenter the rest mode. Recognition of the command word "error" causes controller 150 to revert to the initial phase of the dialing mode so that the erroneously recognized number may be repeated. In the absence of recognition of either command word in the verification interval, the WC signal returned from recognizer 130 causes controller 150 to transfer the previously received number code to Directory Store 170 to address the corresponding dialing code (box 817). The dialing code corresponding to the identified number is then supplied to dialer pulse former circuit 160 via controller 150.

If a spoken name is identified by word recognizer 130 responsive to an input utterance during the initial phase of the dialing mode, the WC identifying code for the recognized name is supplied to controller 150. Controller 150 sends an emit signal EM to voice response circuit 180 together with a $U_n$ utterance selection signal. Voice response circuit 180 is responsive to these signals to emit an audio signal "I have recognized the name" followed by the name corresponding to identification code WC. The information needed to generate the audio signal for the WC identified name was previously stored in voice response circuit 180 during a preceding training or directory mode.

Upon termination of the audio signal formation, controller 150 is responsive to the VRD ending signal from circuit 180 to enable speech analyzer 110 to receive a short duration utterance for verification of the recognized name. Template control logic 140 is then set to compare any utterance received during the prescribed verification period with the templates for the words "stop" and "error" (box 814). If recognizer 130 identifies an utterance in the verification period as "stop", controller 150 is placed in its rest mode. The recognition of an utterance in the verification period as "error" places controller 150 in the initial phase of the dialing mode so that the name may be repeated. In the absence of recognition of the utterance in the verification period as "stop" or "error", a verification code is transferred to controller 150. Directory store 170 is then addressed by signal DA to retrieve the dialing code corresponding to the identification code WC for the verified name (box 817). The dialing code is then transferred to dialer pulse former 160 which produces the necessary dialing signals for the telephone instrument.

Upon successful completion of the dialing operation, controller 150 is placed in a call state (box 819) in which template control logic 140 is set to restrict comparison of utterance feature signals from analyzer 110 to the template "hang up". Upon recognition of "hang up" uttered by the user, the call is terminated and controller 150 is reset to its rest mode.

The training mode (box 850) is initiated by the detection of the utterance "train" while the circuit of FIG. 1 is adapted to receive the restricted utterance set consisting of "off-hook", "directory," and "train" in its rest state. Controller 150 is then switched to its training state in which a sequence of template signals are generated for use in future dialing or directory modes. Alternatively, the training mode can be started upon initial turn on of the dialer circuit. Voice response circuit 180 is used to direct the user to utter the words for which templates are required. These words include a set of commands and the digits 0 through 9.

The training operation may, for example, generate templates for the command word "off-hook." At the beginning of this training sequence, voice response circuit 180 emits the prestored phrase "At the tone, say the word" responsive to utterance selection signals $U_n$ from controller 150. Upon completion of the phrase synthesis, the VRD signal from circuit 180 is sent to controller 150. The utterance selection signal is then changed so that voice response circuit 180 emits the desired command word "off-hook." The utterance selection is again changed responsive to the VRD signal and a tone is emitted by circuit 180. The next VRD signal from circuit 180 causes controller 159 to activate speech analyzer 110 so that the feature signals for the next utterance corresponding to "off-hook" can be processed.

Upon completion of the utterance analysis signal FI from analyzer 110 alters the state of controller 150 so that the template for the utterance is produced by recognizer 130 and stored in template memory 120. When the template storage is completed, the WRD signal from recognizer 130 causes controller 150 to initiate the training cycle for the next word. Usually only a single set of templates is needed for accurate recognition of each utterance. The arrangement of FIG. 1 controller 150 may be adapted to provide more than one template for each utterance. In that event, the training for the command word "off-hook" is repeated. The training mode continues until at least one template is generated for each command word and each digit. At the end of the training mode the template count is stored in controller 150 and the controller is reset to its reset state.

The directory mode is started upon the recognition of the command word "directory" while the circuit of FIG. 1 is in its rest state. In the directory mode the circuit of FIG. 1 is adapted to generate templates for names added to the repertoire of the dialer, to delete entries in the repertory dialer, or to modify the telephone number information for a specified name. Upon initiation of the directory mode, speech analyzer 110 is conditioned to generate feature signals corresponding to the next utterance applied to microphone 101.

Recognizer 130 is adapted to detect whether the utterance from analyzer 110 corresponds to one of the restricted set "add," "delete," "modify," "stop" or none of these command words as shown in box 952 of FIG. 9. Where the utterance is identified as other than one of these command words, controller 150 is reset to the start of directory mode so that it may receive further utterances. If the utterance is identified as the command word "stop," controller 150 is switched to its rest mode. The identification of an input utterance as "add" changes the state of controller 150 so that the circuit of FIG. 1 can receive additional name entries. Templates to be added to the repertoire as generated and stored in template memory 120 and corresponding directory dialing codes are placed in directory store 170. Recognition of an utterance as "delete," permits the user to erase templates and directory dialing codes for a particular name entry. Utterance identification as "modify" permits the user to change the directory dialing codes in store 170 for a particular name entry in template memory 120.

Assume that a user desires to add a name and associated dialing information to the repertoire of the circuit of FIG. 1. Upon recognition of an utterance as "add," controller 150 sends signals to voice response circuit 180 so that the phrase "Speak the name to be added" is generated in circuit 180 and emitted from speaker 190. Speech analyzer 110 is then conditioned to produce feature signals for the next utterance received by microphone 101 and to transmit to voice response response circuit 180 coded speech pattern SP representative of the utterance. This speech pattern is stored in the next free name store position of circuit 180. After generation of the template for the name utterance by recognizer 130, the template is stored in memory 120.

After the template for the added name is entered into template memory 120 (box 955 in FIG. 9), the state of controller 150 is modified so that voice response circuit 180 emits the phrase "Enter number for" followed by the added name speech signal retrieved from storage in the voice response circuit. At this time, the restricted vocabulary is changed to the set of digits for which templates exist in memory 120 (box 957). The telephone number for the added name is then uttered by the user and feature signals for the uttered digits are applied to recognizer 130. The digit sequence is identified in recognizer 130 after comparison with the digit templates from memory 120. The identified digits are then verified (box 958) through the use of voice response circuit 180. After verification, dialing codes for the identified digits are stored in directory store 170. Finally the maximum template number TMAX in controller 150 is modified to reflect the added name. After the updating of the maximum template number, controller 150 is placed in its rest mode.

Deletion or modification of a repertory dialer entry is accomplished by initial recognition of the name for the entry to be modified (box 954) or deleted (box 961), verification of the recognized name (boxes 956 and 963) and deletion (970) or modification (boxes 957, 958, 970) as required. The deletion and modification operations utilize voice response circuit 180 to provide cueing signals to the user as described with respect to the add operation. Speech analyzer 110 and recognizer 130 are used to identify the utterances of the user.

Figures 2, 7:
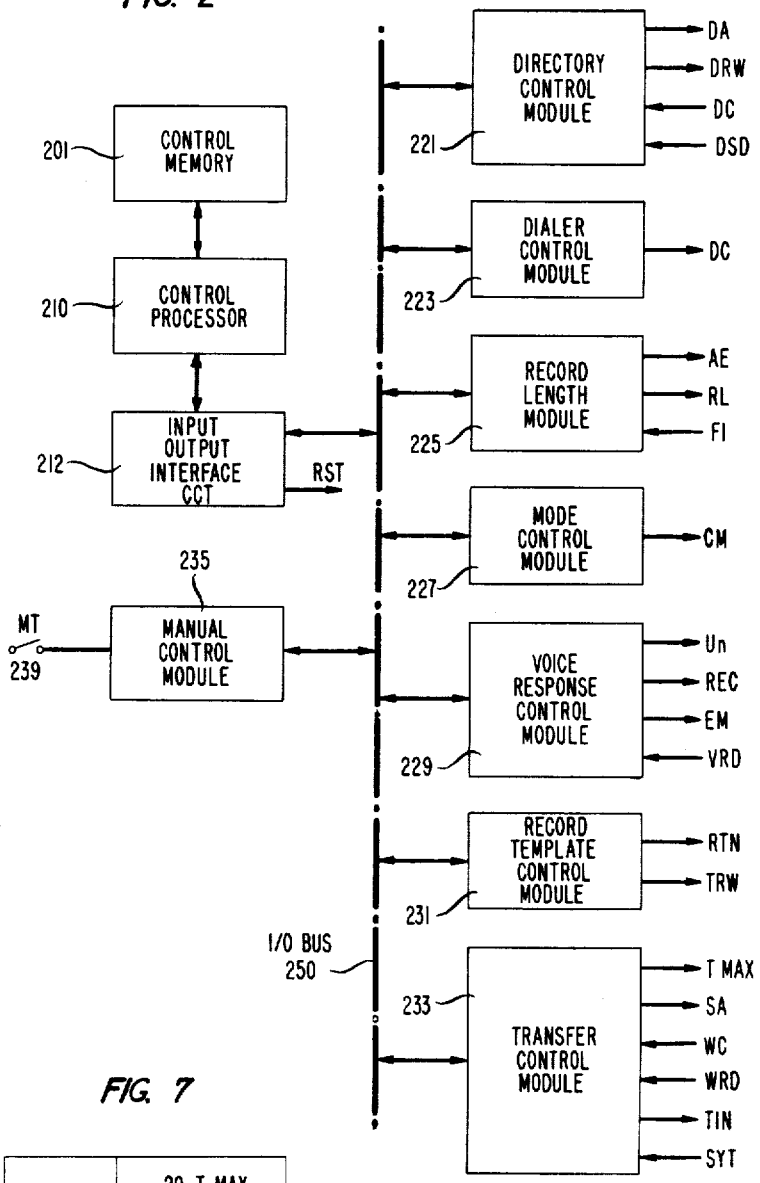
FIG. 2 shows a block diagram of a controller circuit useful in the dialing system of FIG. 1.
FIGS. 6 and 7 show memory arrangements used in the template control logic circuit of FIG. 3.

Controller 150, shown in greater detail in FIG. 2, comprises control processor 210, control memory 201, and input-output interface circuit 212. Interface 212 communicates with the other apparatus of FIG. 1 via bus 250 and control modules 221, 223, 225, 227, 229, 231, 233 and 235. Signals from analyzer 110, recognizer 130, voice response circuit 180, template memory 120 and directory store 170 are supplied to processor 210 via the control modules, bus 250 and interface 212 as is well known in the art. Jointly responsive to the permanently stored control signals in memory 210 and the signals from interface 211, control processor 210 provides control and data signals to the control modules via interface 212 and bus 250.

Controller 150 may comprise an arrangement of microprocessor integrated circuit modules such as described in the Microproducts Hardware Systems Reference published by Data General Corporation, Westboro, Mass. and copyrighted by Data General Corporation, 1979. Other microprocessor systems well known in the art may also be used. In FIG. 2, control processor 210 and input-output interface 212 may be the micro Nova MP100 system processing unit. Control memory 201 may comprise the MP/100 4K/8K dynamic random access memory and the MP/100 8K programmable read only memory. Each of control modules 221, 223, 225, 227, 229, 231, 233, and 235 may comprise the model 4222 digital I/O interface described in the aforementioned publication. The operation sequence of controller 150 is determined by the permanently stored instructions of the read only memory portion of control memory 201. These instructions are listed in Fortran language form in Appendix A.

Directory control module 221 is connected between bus 250 and directory store 170. Responsive to directory store control signals generated in processor 210, module 221 provides directory store address signals DA and directory store reading and writing signals DRW to store 170 and transfer the directory codes DC and directory store done signal DSD from store 170 to processor 210 via interface 212. Dialer control module 223 receives processed dialing information from processor 210 via interface 212 and transfers said dialing information as signal DC to dialing pulse former 160 under control of memory 201. Mode control module 227 is adapted to store the current mode code signal CM obtained from processor 210 and to apply said mode signal to template control logic 140 whereby template selection for each controller state is determined.

Voice response control module 229 receives utterance number $U_n$ signals, and record and emit signals RE and EM from processor 210. Voice response done signals VRD are received from voice response circuit 180. Module 229 is adapted to control the selection of utterances in voice response circuit 180 for user cueing and verification. Record template control module 231 connected between bus 250 and template memory 140 is operative to direct the operation of template memory. Control signals RTN and TRW from module 231 cause the templates generated in word recognizer 130 to be recorded in memory 140. Transfer control module 233 is connected between word recognizer 130 and bus 250. Module 233 receives control pulse SA from processor 210 which signal is used to initiate the recognition operations of word recognizer 130 and receives the identification and recognition done signals WC and WRD from recognizer 130 which signals are transferred to processor 210 via interface 212. Manual control module 235 is adapted to permit control by the installer or user independent of speech signals.

Figure 10:
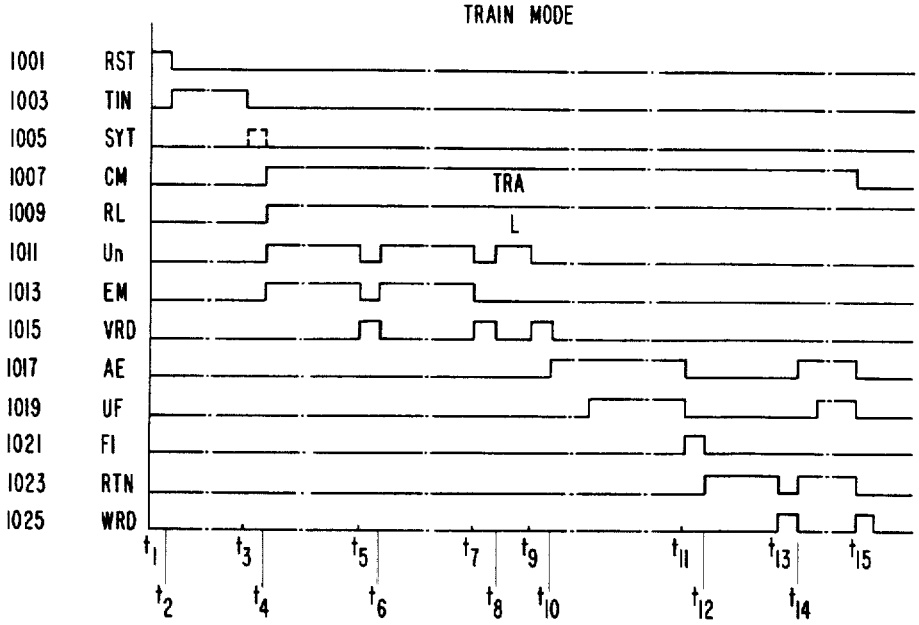
FIGS. 10–13 show waveforms illustrating the operation of the circuit of FIG. 1.

When the repertory dialer is installed and power is turned on, the controller and all other portions shown in FIG. 1 are reset by signal RST at time $t_1$, as shown in waveform 1001 of FIG. 10. Following initial reset, processor 210 is rendered operative to generate a template inspection command signal TIN responsive to the permanently stored instruction set in memory 201. Signal TIN (waveform 1003) is supplied to word recognizer 130 between times $t_2$ and $t_3$ in FIG. 10 via interface 212, bus 250 and transfer control module 233. In recognizer 130 shown in greater detail in FIG. 5, signal TIN conditions word recognition processor 503 to sequentially receive the templates stored in template memory 120 as addressed by template counter 507. Word recognition processor may comprise any of the well known recognition arrangements such as disclosed in U.S. Pat. No. 4,181,821 issued to Frank C. Pirz and Lawrence R. Rabiner on Jan. 1, 1980 or in the article "Minimum Prediction Residual Applied to Speech Recognition" by F. Itakura IEEE Transactions on Acoustics, Speech, and Signal Processing. Vol. ASSP 23, pp. 67–72, February 1975.

The templates in memory 120 are transferred into processor 503 via template feature latch 505. Processor 503 is operative to detect the presence of templates for the command words and numbers used in the system and to return a system trained signal SYT to processor 210 via transfer control module 233 in the event that valid templates are found for command and number words. Signal SYT is shown as waveform 1005 between times $t_3$ and $t_4$ in FIG. 10. In the absence of an SYT signal, processor 210 is placed in its train mode. The templates for the command words and numbers used in the system are then generated responsive to curd isolated utterances by the user. The train mode may also be started by closing switch 239 connected to manual control module 235.

Upon initialization of the train mode at a time $t_4$, control processor 210 generates and transfers a CM=TRA command signal (waveform 1007 in FIG. 10) to mode control module 227, a record length RL=L signal (waveform 1009) to record length module 225, as well as a predetermined utterance number signal $U_n$ (waveform 1011) and an emit signal EM (waveform 1013) to voice response control module 229. The utterance number signal $U_n$ addresses spoken message and number store 430 in voice response circuit 180 shown in FIG. 4 at time $t_4$. Store 430 comprises a read only memory in which predetermined spoken message codes and spoken digit codes are permanently stored. The output of comparator 440 enables store 430 if the utterance number code is less than constant K1. Responsive to signal $U_n$ the prestored message corresponding to address signal $U_n$ is transferred from store 430 to speech synthesizer 410.

Speech synthesizer 410 is operative as is well known in the art to produce an audio signal corresponding to the $U_n$ message. This audio signal is then supplied to speaker 190 to cue the user. The first message "At the tone, say the word" is supplied to the user. Upon termination of the message generation at time $t_5$ in FIG. 10, a VRD signal (waveform 1015) is returned to processor 210 via voice response control module 229. Processor 210 under control of memory 201 then supplies the next $U_n$ code (waveform 1011) to memory 430 between times $t_6$ and $t_7$ in FIG. 10 so that the first command word "off-hook" is emitted from speaker 190. Upon return of the VRD signal at time $t_7$ to control module 229, the $U_n$ address signal is changed to provide a tone from voice response circuit 180.

Responsive to the VRD signal from synthesizer 410 after the tone (time $t_9$), processor 210 enables speech analyzer 110 with an AE signal (waveform 1017 at time $t_{10}$). A set of utterance feature signals UF (waveform 1019) corresponding to the next utterance of the user is thereby generated. The UF utterance feature signals are then supplied to utterance feature latch 501 in FIG. 5. At the termination of the feature signal generation ($t_{11}$ in FIG. 10), speech analyzer 110 produces an FI ending signal (waveform 1021) which signal is transferred to processor 210 via record length module 225.

Responsive to the detection of the FI signal in processor 210, word recognition processor 503 is enabled to produce a template corresponding to the user's utterance of the word "off-hook." The "off-hook" template position of template memory 120 is then addressed by record template signal RTN (waveform 1023) from record template control module 231 and the template feature signals FR corresponding to the command word "off-hook" are stored between $t_{12}$ and $t_{13}$. Upon completion of the template storage operation, a WRD ending signal (waveform 1025) is returned to processor 210 from word recognition processor 503 via transfer control module 233.

The WRD signal at time $t_{13}$ causes processor 210 to send signals to voice response circuit 180, speech analyzer 110, word recognizer 130 and template memory 120 so that a template for the next command word "directory" is stored responsive to another user utterance. The remaining command words required by the circuit of FIG. 1 for automatic dialing are then generated in sequence by recognizer 130 responsive to utterances of the user as directed by voice response circuit 180. The generation and storage of these templates are substantially similar to that described with respect to the "off-hook" template. Subsequently templates are generated for the digits 0 through 9 as described with respect to "off-hook." Responsive to the WRD signal (waveform 1025) from processor 503 upon storage of the template for the digit "9," processor 210 is placed in its rest mode (time $t_{15}$ in FIG. 10).

Figure 11:
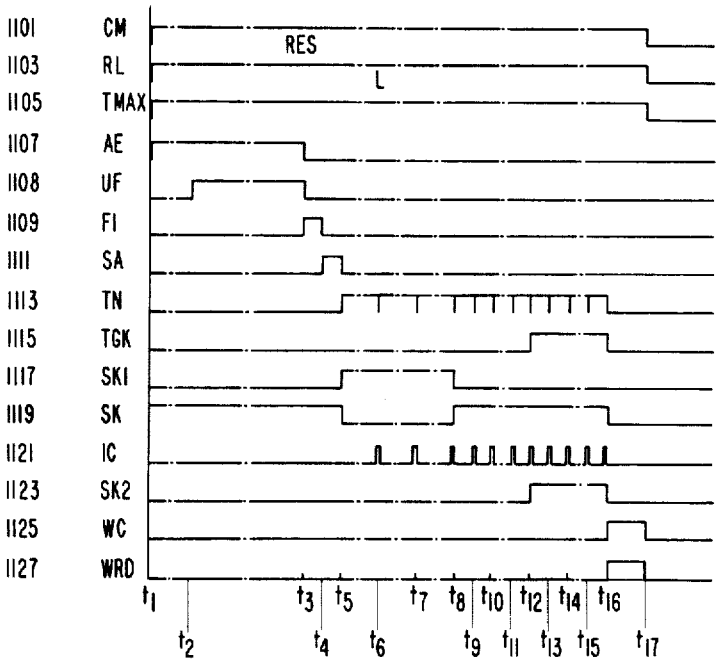

At the start of the rest mode, control processor 210 generates a mode command signal RES corresponding to the rest mode, a record length signal L to permit receipt of a long utterance by speech analyzer 110, and a last template signal TMAX to designate the final template position of template memory 140. The RES signal is transferred to mode control module 227 via interface 212 and a bus 250 and is stored in module 227. The record length signal L is transferred from processor 210 to record length module 225 and the TMAX signal is transferred from processor 210 to transfer control module 233. The waveforms of the rest mode are shown in FIG. 11. Waveform 1101 corresponds to command signal RES. Waveform 1103 corresponds to the RL=L signal and waveform 1105 corresponds to the TMAX signal.

The RL=L signal is applied to speech analyzer 110 at time $t_1$ in FIG. 11 and the analyzer is conditioned by signal AE (waveform 1107) from control module 225 to begin receiving utterances. The CM=RES command signal from module 227 is supplied to template control logic 140 at $t_1$ and is effective to restrict the vocabulary of template signals in the rest mode to "off-hook," "train," and "directory." The TMAX signal from module 233 is applied to word recognizer 130 to identify the occurrence of the last template stored in template memory 120.

At this time, processor 210 is placed in a wait condition until the feature signals UF (waveform 1108) of an incoming utterance are available at the output of speech analyzer 110 at time $t_2$. Responsive to any input utterance at microphone 101, analyzer 110 generates a set of feature signals corresponding thereto. The feature signals are transferred to UF latch 501 of word recognizer 130. After completion of the UF feature signal transfer ($t_3$), analyzer 110 produces an FI control signal (waveform 1109) which is supplied to processor 210 via record length module 225 and interface 212. Upon detection of the FI control signal in the rest mode, processor 210 is operative to generate an SA control signal (waveform 1111 at $t_4$). The SA control signal is supplied to word recognizer 130 via interface 212, bus 250 and transfer control module 233. The SA signal resets template counter 507 and flip-flop 510 in FIG. 5. Template counter 507 is thereby set to its initial count which is supplied as the TN address signal (waveform 1113) at $t_5$ to template memory 120 and template logic control 140 shown in greater detail in FIG. 3.

Figure 3:
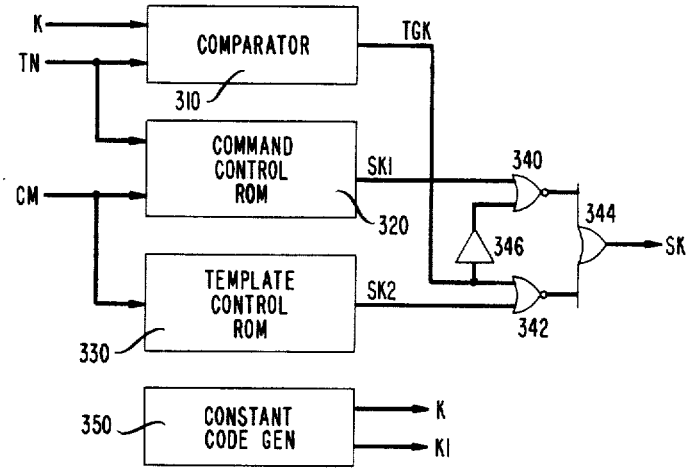
FIG. 3 shows a template control logic circuit used in the dialing system of FIG. 1.
Figures 5, 6:
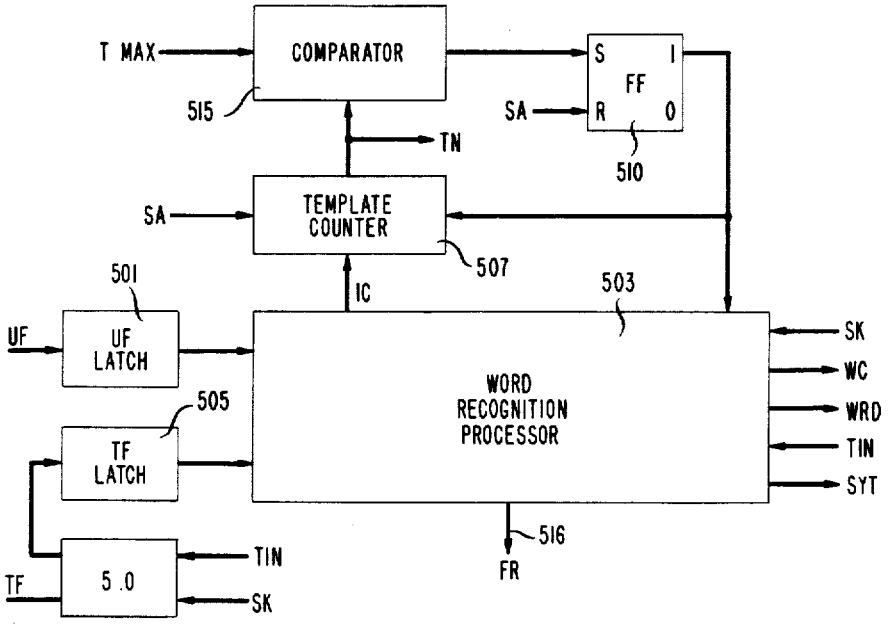
FIG. 5 shows a spoken word recognizer circuit useful in the dialing system of FIG. 1.

Referring to FIG. 3, template control logic 140 includes comparator 310, command control read only memory (ROM) 320 and template control read only memory (ROM) 330. Comparator 310 may be, for example, a type SN7485 integrated circuit made by Texas Instruments, Incorporated. The ROMS may each comprise, for example, a type 74S285 circuit made by Texas Instruments, Incorporated. Command control ROM 320 is addressed by template number TN from recognizer 130 and command code CM=RES from control module 227. The arrangement or map of ROM 320 is shown in FIG. 6. For each state of controller 150, a single bit code is assigned to the first nineteen templates. A stored "one" in a position of memory 320 permits the template addressed in a given state of controller 150 to be transferred from template memory 120 to word recognizer 130. A "zero" in a given position of memory 320 causes a skip signal (SK) to be applied to recognizer 130 whereby the address template is not supplied to word recognizer 130 in the assigned state of controller 150. In this manner, the reference vocabulary templates to which each utterance is compared are selectively controlled.

In the rest state, the command signal from control module 227 is RES whereby the first row of FIG. 6 is addressed for template numbers TN from 1 to 19. Initially, TN=1 signal is obtained from template counter 507. Jointly responsive to the RES command signal from control module 227 and the TN=1 signal, the SK1 output (waveform 1117) of command control ROM 320 becomes a 1 at $t_5$. Comparator 310 compares the template address number TN with the constant code K=19 from constant code generator 350. Generator 350 may comprise, for example a binary switch appropriately connected to a resistor network between a constant voltage source and ground. The switch may be set to a voltage value corresponding to the binary number representation of a constant. For TN=1, the TGK output of comparator 310 is low whereby NOR-gate 342 is inhibited and NOR-gate 340 is alerted. Since the SK1 signal from ROM 320 is high for TN=1 in the rest state, gate 340 is enabled and a low SK signal is obtained from OR-gate 344. The low SK signal (waveform 1119 between $t_5$ and $t_6$) is applied to word recognition processor 503 which maintains counter 507 in its TN=1 state. The TN address from counter 507 is effective to retrieve the first template corresponding to the command word "off-hook" from template memory 120 and to apply the retrieved template feature signals to TF latch 505.

Jointly responsive to the utterance feature signals UF in latch 501 and the template feature signals TF in latch 505, word recognition processor 503 generates a signal representative of the similarity of the input utterance to the command word "off-hook." The similarity signals is stored in processor 503 and template counter 507 is incremented to its next state by signal IC (waveform 1121) from processor 503. The TN address code is thereby changed to 2 at $t_6$. Responsive to the rest command signal RES and the TN=2 address, an SKI=1 signal is obtained from command control ROM 320. The SK signal from OR-gate 344 remains low between $t_6$ and $t_7$ and the template for the command word "directory" is retrieved from memory 120 as the FT feature signal set.

Word recognition processor 503 is then operative, as is well known in the art, to produce a signal representative of the similarity between the utterance feature signals in latch 501 and the template feature signals for "directory" in latch 505. After the TN=2 similarity signal is stored in processor 503, template counter 507 is incremented to its TN=3 state by signal IC (waveform 1121) from processor 503. Responsive to the 1 signal in the command control ROM retrieved for the rest mode third template address, the template signal for the command word "train" is retrieved from template memory 140 and placed in latch 505. After the similarity signal for "train" is stored in recognition processor 503, template counter 507 is again incremented by signal IC. At time $t_8$ the template address becomes TN=4.

As shown in FIG. 6, there is a "zero" in each of template positions 4 through 19 of the rest mode row. Consequently, a zero SK1 signal is obtained from ROM 320 and a high SK signal appears at the output of OR-gate 344. Template counter 507 is immediately incremented responsive to the high SK signal. Gate 520 prevents the TF template signals from being applied to processor 503, and processor 503 is inhibited from generating a similarity signal. In this way, the template for the command word "add" is skipped. The TN=5 address signal (waveform 1113) from counter 507 in the rest mode between $t_9$ and $t_{10}$ also causes a high SK signal to appear at the output of OR-gate 344. Responsive to the high SK signal, word recognition processor 503 provides an IC pulse at time $t_9$ to template counter 507. The template for the command word "delete" is thereby skipped. In similar manner, the command word templates for addresses TN=6 through TN=19 are skipped. When the TN=20 address from template counter 507 is applied to comparator 310 ($t_{12}$), a high TGK signal (waveform 1115) is produced. The TGK signal disables NOR-gate 340 and alerts NOR-gate 342. For the remainder of the rest mode, the output of template control ROM 330 determines the state or OR-gate 344.

FIG. 7 shows the arrangement of read only memory 330. For each state row, there is a single bit used for all name entries in the system. In the rest mode, names are excluded from the restricted vocabulary. There is a zero in the first row of ROM 330. Consequently, a zero SK2 signal is obtained from ROM 330 in each name position. When the TN address is 20 a high SK signal appears at the output of OR-gate 344. Template counter 507 is immediately incremented. Gate 520 is inhibited, and the template for the TN=20 address is skipped. All subsequent name templates are also skipped. In this manner, the utterance feature signals UF are compared to the restricted group of templates "off-hook," "directory," and "train" in the rest mode.

When the TN address is TMAX ($t_{15}$), the output of comparator 515 sets flip-flip 510. Processor 503 is thereby enabled to select the most similar of the selected templates in the rest mode. Identification signal WC (waveform 1125 between $t_{16}$ and $t_{17}$), corresponding to the template found most similar to the input utterance feature signals UF, is supplied from processor 503 to transfer control module 233. Signal WC is applied therefrom to control processor 210 via bus 250 and interface circuit 212. In the event that none of the templates is within a prescribed degree of similarity, a WC=0 identification signal is returned. A WRD recognition done signal (waveform 1127) is also supplied to processor 210. Where the word uttered by the user in the rest mode is "directory," the WC identification signal corresponding thereto causes processor 210 to be switched to its directory mode.

Figure 12:
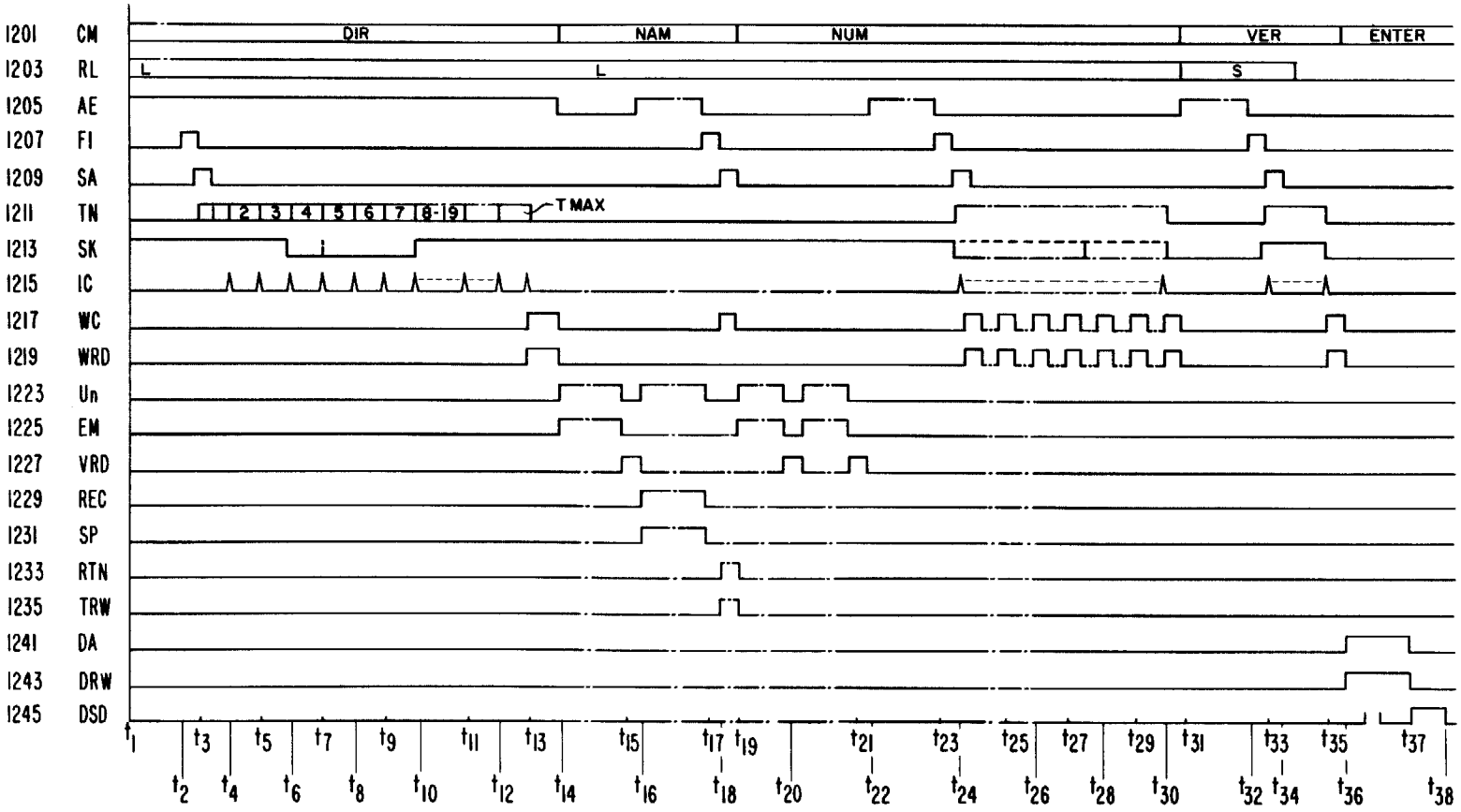

The circuit of FIG. 1 is conditioned in the directory mode to add, modify or delete entries in the repertoire responsive to spoken directions of the user. In the initial portion of the directory mode, command signal DIR is generated in processor 210 and transferred to mode control module 227. A long record length control signal (RL=L) and a speech analyzer enable signal (AE) are generated in processor 210 and transferred to record length module 225. Responsive to the AE and RL signals from module 225, speech analyzer 110 is turned on so that utterance feature signals are produced responsive to the next utterance signals supplied from microphone 101. The waveforms of the signals of the directory mode are illustrated in FIG. 12. Waveform 1201 corresponds to the command signal CM=DIR between times $t_1$ and $t_{14}$. Waveform 1203 corresponds to the RL signal and waveform 1205 corresponds to the AE signal.

When the last utterance feature signal is transferred from analyzer 110 to utterance feature latch 501 at time $t_2$, an FI signal (waveform 1207) is sent to processor 210 from the analyzer via record length module 225, bus 250 and interface circuit 212. Processor 210 is conditioned to detect signal FI and to generate a start recognition signal SA (waveform 1209) responsive thereto at time $t_3$. The SA signal is transmitted via transfer control module 223 to template counter 507 and flip-flop 510. Signal SA resets flip-flop 510 so that word recognition processor 503 and counter 507 are rendered operative. Signal SA also resets counter 507 to its TN=1 state at time $t_3$ whereby the first template in template memory 120 is addressed. Signal TN (waveform 1211) is also applied to comparator 310 in template control logic 140 so that NOR-gate 340 is alerted.

Command signal DIR addresses the "directory" row of ROM 320 shown in FIG. 6. Since the TN=1 signal to ROM 320 addresses the "off-hook" first column, a zero SK1 signal appears at the output of ROM 320. The outputs of NOR-gate 340 and OR-gate 344 are forced high and a high SK signal (waveform 1213) is sent to processor 503 in FIG. 5. The high SK signal inhibits gate 520, prevents processor 503 from generating a similarity signal for the TN=1 template and causes processor 503 to apply an IC signal (waveform 1215) to increment template counter 507 to its TN=2 state at time $t_4$. The zero in the second column of the directory row of ROM 320 prevents comparison of the utterance feature signals in latch 501 with the template feature signals for the second command word "directory." Similarly, the template for the third command word "train" is skipped.

Jointly responsive to the directory command and the TN=4 address signal at time $t_6$, a low SK output is obtained from OR-gate 344. Recognition processor 503 is enabled to generate a similarity signal responsive to the utterance feature signals in latch 501 and the template feature signals for the command word "add." The template feature signals for "add" are retrieved from template memory 120. The similarity signal for "add" is produced and stored in recognition processor 503 and template counter 507 is incremented to its TN=5 state. The one signal stored in the fifth, sixth, and seventh columns of the addressed directory row in FIG. 6 provide permissive SK signals (waveform 1213) to processor 503 for the command words "delete," "modify," and "stop" between $t_7$ and $t_{10}$. The template feature signals for these command words are successively retrieved from template memory 120 under control of counter 507 and similarity signals for these templates are generated and stored in processor 503.

The TN=8 through TN=19 positions of the directory row in ROM 320 contain zeros. Consequently, the templates for the remaining command words "error,"

and "hang up," and the digits 0 through 9 are not retrieved from memory 120 and no similarity signals for these templates are produced in processor 503. When the TN=20 address is obtained from counter 507 at time $t_{11}$ in FIG. 12, comparator 310 produces a high output whereby NOR-gate 340 is disabled and NOR-gate 342 is alerted. The SK2 outputs of ROM 330 are then used to control the operation of processor 503.

As shown in FIG. 7, a zero is obtained from ROM 330 in the directory row whereby all name templates in memory 120 are skipped responsive to the DIR command word applied to ROM 330. After the last name in memory 120 is addressed by counter 507, the TN output therefrom is equal to the TMAX signal stored in transfer control module 233. The output of comparator 515 becomes high, flip-flop 510 is set so that counter 507 is inhibited. Word recognition processor is thereby conditioned to generate a WC=0 signal or a WC identification signal (waveform 1217) corresponding to the most similar template signal to the utterance features in latch 501 at time $t_{13}$. The identification signal is applied to processor 210 along with a WRD ending signal (waveform 1219) from processor 503 via control module 233.

Figure 4:
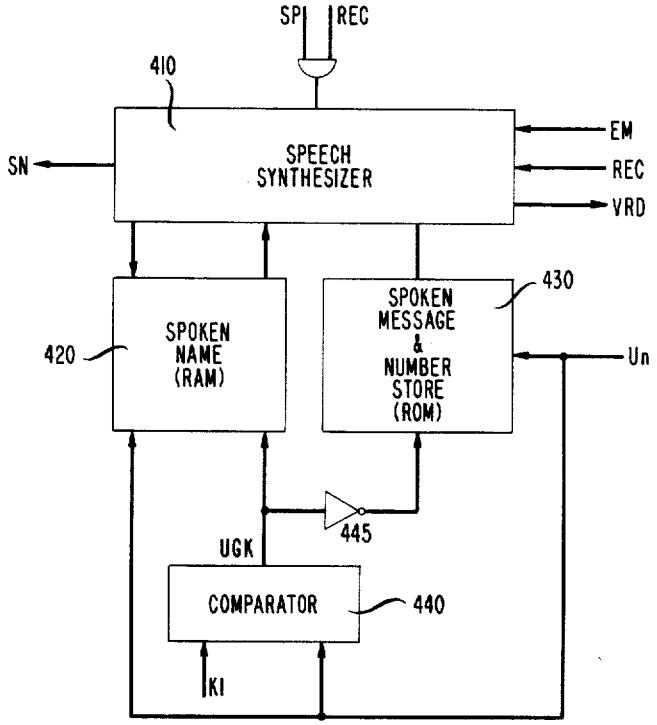
FIG. 4 shows a voice response circuit useful in the dialing system of FIG. 1.

In accordance with the invention the template control logic of FIG. 4 is operative in each command word state to select a restricted group of template signals to which the input utterance is compared. Thus, the utterance feature signals in the initial portion of the directory mode can be recognized only as "add," "delete," "modify," or "stop." Advantageously, the template set selection provides more accurate recognition even with high background noise and extraneous voice signals from other persons in the vicinity of microphone 101. As aforementioned with respect to other command word states, recognition of the command word "stop" in the initial phase of the directory mode causes processor 210 to switch to the rest mode. Where other than the permitted command words are recognized, the WC=0 coded signal sent to processor 210 causes the processor to return to the initial portion of the directory mode. Assume for purposes of illustration that the command word "add" is recognized. Detection of the WC signal for the command word "add" causes processor 210 to switch into its name state (NAM).

The name state of the directory, mode is initiated at time $t_{14}$. The command signal CM=NAM (waveform 1201), the utterance address signal $U_n$ (waveform 1223) for the phrase "Speak the name to be added," and an emit signal EM (waveform 1225) are generated in processor 210. The NAM command signal is stored in mode control module 227 and the $U_n$ and EM signals are placed in voice response control module 229. Responsive to the $U_n$ signal, the coded speech signal sequence for the phrase "Speak the name to be added" is supplied from read only memory 430 to speech synthesizer 410. Responsive to control signal EM, synthesizer 410 generates the speech signal corresponding to the coded phrase from memory 430 and transmits the signal to speaker 190. Signal VRD (waveform 1227) indicating the completion of the message is returned to voice response control module 229 at time $t_{15}$. Signal VRD is supplied therefrom to control processor 210 via interface 212. Assume for purposes of illustration that the name "Smith" is to be added to the repertoire.

Detection of the VRD signal in processor 210 at time $t_{16}$ causes the processor to generate an utterance identification signal $U_n$ corresponding to the next free name entry in spoken name store 420, a record signal REC (waveform 1229), and an AE analyzer enable signal. The $U_n$ and REC signals are placed in control 229 while the AE signal is stored in record length module 225. The AE signal is supplied to speech analyzer 110 from module 225 so that analyzer 110 receives the next utterance signals from microphone 101. Coded speech signals SP as well as utterance feature signals UF are now generated in analyzer 110. The coded speech signals SP (waveform 1231) are supplied to synthesizer 410 via gate 450. After processing in the synthesizer, the coded signals for the name "Smith" are placed in the $U_n$ designated address of spoken name store 420. The UF feature signals from analyzer 110 are supplied to utterance feature latch 501. Upon completion of the utterance feature generation, signal FI is produced in analyzer 110 at time $t_{17}$. Signal FI is transferred to central processor 210 via control module 225.

At time $t_{18}$, processor 210 generates an SA signal (waveform 1209). The SA signal is operative to enable word recognition processor 503, a record template address signal RTN (waveform 1233) to select the TMAX+1 address in template memory 120, and a template write signal TRW (waveform 1235). The TRW signal causes the template generated for the name "Smith" to be recorded in template memory 120. Recognition processor 503 produces a template corresponding to "Smith" from the utterance feature signals in latch 501. The resulting template is supplied to memory 120 via line 516. The RTN and TRW signals from record template control module 231 permits the template for the name "Smith" to be stored in the next available address (TMAX+1) in memory 120. The WRD signal is generated after storage of the "Smith" template.

After the "Smith" template is stored, processor 210 is switched to its number state and is rendered operative to generate a $U_n$ utterance number signal corresponding to the message "Enter the number for" and an emit signal which signals are supplied to ROM 430 and synthesizer 410, respectively. These signals as well as a CM=NUM command signal are generated at time $t_{19}$ in FIG. 12. Synthesizer 410 then generates the addressed message and returns a VRD signal to processor 210 at time $t_{20}$. Responsive to the VRD signal, processor 210 generates an utterance number $U_n$ corresponding to the message "Smith" and this message is produced by speaker 190 responsive to the emit signal EM. After the next VRD signal is returned to processor 210 at time $t_{21}$, analyzer 110 is turned on by the AE signal from processor 210. The next utterance at microphone 101 can then be converted into feature signals.

The user then utters a string of numbers, e.g. 7-2-1-1-5-2-4 which corresponds to the telephone directory number for "Smith." After the utterance feature signals are generated in analyzer 110, the FI signal therefrom causes processor 210 to generate an SA signal at time $t_{24}$. The signal is transferred to the word recognizer of FIG. 5 via transfer control module 233. As previously described, the SA signal resets template counter 507 to its TN=1 state and switches flip-flop 510 to its reset state. Word recognition processor 503 is enabled to generate a signal representative of the similarity of the first digit of number string utterance and the selected templates in the number phase of the directory mode. The recognition of the number sequence is generally indicated in the time interval between $t_{24}$ and $t_{31}$ in FIG. 12.

The CM=NUM signal (waveform 1201) from mode control module 227 addresses the number row of command control memory 320 and the TN=1 address signal from counter 507 addresses the first column of memory 320. The zero SK1 output of memory 320 enables gate 340 so that a high SK signal is obtained from OR-gate 344. The high SK signal is applied to processor 503 in FIG. 5 which in turn produces an IC signal to increment counter 507. Similarity signal generation is also inhibited responsive to the high SK signal during the TN=1 address. In similar fashion, the templates for the TN=2 through TN=6 command word template addresses are skipped responsive to the zero entries in the number row of memory 320.

When counter 507 is incremented to its TN=7 state, a low SK signal is obtained from OR-gate 344 and the template signals for the command word "stop" are retrieved from template memory 120. A similarity signal is then produced in word recognition processor 503 jointly responsive to the first digit utterance feature signals in latch 501 and the "stop" command word feature signals in latch 505.

The zeros in the TN=8 and TN=9 column for the number row in FIG. 7 causes the templates for the command words "error," and "hang up" to be skipped. Responsive to the one signals in the TN=10 through TN=19 positions of the number row of FIG. 7, the templates for the digits 0 through 9 are successively retrieved from template memory 120. Similarity signals corresponding to these templates are produced. After a signal corresponding to the similarity between the first digit of the utterance number string and the stored template feature signal for the TN=19("9") template is produced and stored in processor 503, template counter 507 is incremented to its TN=20 state. The TGK output of comparator 310 now alerts NOR-gate 342 and the zero code in the number row of template control ROM 330 results in a high SK signal from OR-gate 344. The SK signal remains high for template addresses TN=20 through TN=TMAX whereby the name templates in template memory 120 are skipped and no similarity signals are produced for the name templates.

After the TN=TMAX template address is obtained from counter 507, comparator 515 provides an output which resets flip-flop 510. The one output of flip-flop 510 then causes word recognition processor 503 to produce a template identification signal for the best matched template of the group including command word "stop" and the digit templates. In the event that none of the template similarity signals attain a predetermined threshold, a zero identification signal is generated in processor 503. Detection of the WC=0 signal resets processor 210 to the beginning of the number phase of the directory mode in which the number inquiry message is repeated. Detection of a WC=7 ("stop") signal by control processor 210 resets the processor to the initial phase of the rest mode.

Assume that the identification signal WC=17 corresponding to recognition of the digit "7" is returned to processor 210 from word recognition processor 503 along with the WRD recognition completion signal. Processor 210 then conditions the circuit of FIG. 1 to advance to the second utterance portion identification phase in which the second utterance portion is recognized as one of the templates from the restricted group consisting of the command word template for "stop" and the digit templates. The utterance portions of the digit string utterance are successively identified as described with respect to the first utterance portion and the WC identification signals for the recognized number string is stored in control memory 201. The detection of the WRD recognition completion signal for the seventh recognized utterance portion by processor 210 switches the circuit of FIG. 1 to its verification phase in which the recognized number string is fed back to the user from the coded speech signals in memory 420 via speech synthesizer 410. A short period (e.g. 2 seconds) for user verification is then initiated during which the user may utter the command words "error" or "stop."

At the beginning of the verification phase of the directory mode control ($t_{31}$ in FIG. 12), processor 210 generates an AE signal to enable speech analyzer 110, a record length RL=S signal (waveform 1203) to provide the short user response interval and a CM=VER signal (waveform 1201) to control the vocabulary selection for the verification period. Analyzer 110 is turned on for a short period and feature signals are generated therein for any utterance applied to microphone 101. The FI signal (waveform 1205) from analyzer 110 indicating the completion of the feature signal generation is supplied to processor 210 via record length module 225 at time $t_{32}$. Responsive to the FI signal, processor 210 produces an SA start signal (waveform 1209) for word recognizer 130 at time $t_{33}$.

The verify row of command control memory 320 contains "one" signals in only the TN=7 "stop" and the TN=8 "error" columns and there is a "zero" signal in the verify row of template control memory 330. Consequently low SK signals are obtained for only the TN=7 and TN=8 addresses supplied by template counter 507. For each of these template addresses, the utterance feature signals in latch 501 are compared to the template feature signals supplied to latch 505 from template memory 120 in word recognition processor 503. The two similarity signals are stored in processor 503. The templates for the remaining command words, digits, and names in memory 120 are skipped. The recognition operation is generally indicated between times $t_{33}$ and $t_{35}$ in FIG. 12.

After the TMAX name template is addressed, the output of comparator 515 causes flip-flop 510 to set. Processor 503 is then enabled to generate a WC identification signal (waveform 1217) corresponding to either the most similar template or to no template being within a prescribed degree of similarity at time $t_{35}$. If the "error" template is identified and detected in processor 210, the circuit of FIG. 1 is reset to the number phase of the directory mode and the user is directed to supply a new utterance for the number string. Detection of the "stop" template in processor 210 results in the circuit of FIG. 1 being reset to its rest mode. Where the utterance in the verification interval is not identified as either "error" or "stop," processor 210 detects the WC=0 signal and the circuit of FIG. 1 is advanced to the enter phase of the directory mode.

In the enter phase (beginning at $t_{36}$ in FIG. 12), the codes for the digits of the identified number in control memory 201 are transferred to directory control module 221 under control of processor 210 along with an address code DA (waveform 1241) corresponding to the name "Smith." A directory write signal DRW (waveform 1243) is also produced by control processor 210 and placed in control module 221. The directory code information is then transferred to directory store 170 as addressed by the DA signal in control module 221. The transfer is completed at time $t_{37}$. Between times $t_{37}$ and $t_{38}$, a DSD directory storage complete signal (waveform 1245) is supplied to processor 210 via directory module 221. The circuit of FIG. 1 is then reset to its rest state.

The user may alter the telephone number information for a name entry in the directory repertoire in the directory mode. The modification state of the directory mode is entered upon recognition of the command word "modify" in the directory mode initial phase. Assume for purposes of illustration that the user wishes to modify the directory number for the previously entered name "Jones." The telephone number previously entered for "Jones" was 724–3211. The new number for "Jones" is 724–3522. Upon detection of the identification signal for "modify" by control processor 210 in the directory mode initial phase, processor 210 is operative to generate an AE speech analyzer enable signal, a CM=NAM name command signal, and an RL=L record length signal. These signals are transferred to control modules 225 and 227. The AE and L signals are supplied to speech analyzer 110 which is thereby enabled to receive an utterance signal from microphone 101.

The user utters the name "Jones" and analyzer 110 produces the sequence of utterance feature signals corresponding thereto. These utterance feature signals are transferred to utterance feature latch 501 in FIG. 5. Upon the termination of the utterance feature generation, control signal FI is sent to processor 210 from analyzer 110 via control module 225. Processor 210 detects the FI signal and produces an SA start recognition signal. The SA signal is supplied to template counter 507 and flip-flop 510 in FIG. 5 via transfer control module 233.

As previously described, counter 507 is reset to its TN=1 state. Processor 503 is enabled to produce similarity signals responsive to the utterance feature signals in latch 501 and the restricted vocabulary template feature signals selected by the template control logic of FIG. 3. The restricted vocabulary consists of the repertory names stored in template memory 120 and the command word "stop." The NAM signal from control module 227 is applied to read only memories 320 and 330 so that the name row of these memories is selected. Responsive to the TN=1 through TN=6 address signals from counter 507, a succession of high SK signals is supplied to processor 503 from OR-gate 344. Responsive to the high SK signals, counter 507 is successively incremented while processor 503 is inhibited from producing similarity signals.

When counter 507 reaches its TN=7 state, the one signal in the TN=7 column of the name row of memory 320 causes a low SK signal to be applied to processor 503. The template feature signals for the command word "stop" are then transferred from template memory 120 to template feature latch 505. Word recognition processor 503 is enabled by the low SK signal to produce a similarity signal for the "stop" template. This similarity signal is stored in processor 503 and counter 507 is incremented to its TN=8 state.

Counter 507 sequences through its TN=8 through TN=19 states. In each of these states, a "zero" signal is obtained from ROM 320 and the corresponding template feature signals in template memory 120 are skipped. When counter 507 is placed in its TN=20 state, a "one" signal is obtained from template control ROM 330. A low SK signal is produced and processor 503 is enabled. A similarity signal for the first name template feature signals in template memory 120 is thereby generated and stored in processor 503. In like manner, a one signal is obtained for each name TN address in memory 330 and similarity signals are produced and stored for each name entry in memory 120.

After the similarity signal for the TN=TMAX address is stored in recognition processor 503, comparator 515 sets flip-flop 510. Processor 503 is thereby enabled to produce the WC identification signal and template counter 507 is inhibited. The WC and WRD signals from processor 503 are then applied to control processor 210 via transfer control module 233. Processor 210 detects the WC identification signal. Where the WC identification signal corresponds to "stop," the circuit of FIG. 1 is reset to its rest state. Detection of a WC=0 signal, representative of the lack of similarity between the utterance and any name, causes processor 210 to signal voice response unit 180 to utter the phrase "Repeat the name" and the name state is reentered.

The detection of a name in the directory repertoire causes processor 210 to generate an utterance number signal corresponding to the spoken message "Please verify." Voice response unit circuit 180 provides the speech signal corresponding thereto and returns a VRD voice response done signal to processor 210. The processor then provides an utterance number signal for to the name recognized. Upon completion of the utterance "Jones" by speaker 190, processor 210 is switched to its verify state during which the user may utter "error," "stop" or other than these utterances. Detection of other than these utterances (indicated by a WC=0 signal), causes processor 210 to signal voice response circuit 180 to utter the phrase "Please enter new phone number." After the spoken message is completed, the circuit of FIG. 1 is switched to its number state. The user may then utter the new number for the name "Jones."

During the number state, utterance feature signals are generated for the utterance sequence received by analyzer 110. These digit utterance feature signals are successively compared to the restricted vocabulary. The number state restricted vocabulary is shown in the NUM rows of FIG. 6 and FIG. 7 and is selected under control of template control logic 140. The number state operations for name modification are substantially similar to those described with respect to the addition of a new name and telephone number to the repertory of the automatic dialer. The utterance feature signals for each successive digit spoken by the user is compared to the digit template feature signals of the TN=10 through TN=19. A similarity signal is produced for each comparison and an identification signal (WC) corresponding to the most similar template is transferred from word recognition processor 503 to control memory 201 via control processor 210.

Upon transfer of the identification signal for the last digit utterance, processor 210 signals voice response circuit 180 to provide the message "The new phone number is" followed by the sequence of digits corresponding to the identification codes just stored in control memory 201. Upon receipt of a VRD voice response circuit done signal, processor 210 is switched to its verification state. The user can then prevent entry of the recognized digit sequence by speaking the command word "error" or reset the circuit of FIG. 1 to its rest state by speaking the command word "stop." If neither of these command words are spoken, processor 210 is advanced to the enter phase of the modify operation in which the location of directory store 170 corresponding to "Jones" is changed to the newly recognized digit sequence. Detection of the DSD directory store done signal by processor 210 at the end of the directory storage operation resets the circuit of FIG. 1 to its rest mode.

Upon recognition of the command word "delete" in the initial state of the directory mode, processor 210 is switched to its name state. After the name to be deleted is verified, the addressed section of store 170 corresponding to the recognized name is erased. The template feature signals for the recognized name in template memory 120 are removed. Control processor 210 generates a set of signals which are used to insert an artificial template in place of the deleted signal. The address of the deleted template is stored so that the next insertion of a name template in the address of template memory 120 will use the deleted name address.

After templates for command words, digits and names have been produced and stored in template memory 120 in train and directory modes, the circuit of FIG. 1 may be activated by user utterances to provide repertory and automatic dialing. As aforementioned, the dialer of FIG. 1 is normally in its rest mode prepared to recognize an input utterance as one of the command words "off-hook," "directory," and "train." In order to dial the telephone of a person in the repertoire of the dialer arrangement, the user first utters the command word "off-hook." As previously described, recognition of "off-hook" by the circuit of FIG. 1 switches the dialer to its dial mode in which dialing responsive to a name utterance by the user is done.

At the beginning of the dial mode (time $t_1$ in FIG. 13), processor 210 generates a CM=DIA command signal (waveform 1301), an utterance number code $U_n$ corresponding to a cueing tone and an EM emit signal. The $U_n$ and EM signals (waveform 1303) are transferred via voice response control module 229 to message store 430 and speech synthesizer 410, respectively. The tone signal is emitted from speaker 190, and the VRD voice response unit done signal (waveform 1305) from synthesizer 410 is detected by processor 212 at time $t_2$. The processor sends an AE signal (waveform 1307) and an RL=L signal waveform (1309) to analyzer 110 at time $t_3$. The analyzer generates utterance feature signals for the next utterance received by microphone 101. When the utterance feature signals are transferred to latch 501, analyzer 110 produces an FI signal (waveform 1311). The FI signal is detected by processor 210 by $t_5$. The processor then generates an SA recognition start signal (waveform 1313) which is supplied to template counter 507 and flip-flop 510.

Counter 507 is reset to its TN=1 state. Processor 503 is enabled by flip-flop 510 to generate and store a sequence of similarity signals responsive to the utterance feature signals from latch 501 and the selected template feature signals from memory 120. The template selection is restricted in the initial phase of the dial mode responsive to the CM=DIA dial command code (waveform 1301) from mode control module 227. The columns of the dial rows of memories 320 and 330 are successively accessed by the TN address codes from counter 507 and the CM=DIA code from module 227. The bit pattern of the dial rows assures that only the TN=7 "stop" template, the TN=10 through TN=19 digit templates and the name templates from TN=20 to TN=TMAX are retrieved from template memory 120 for comparison with the utterance feature signals in latch 501. All other templates in memory 120 are skipped responsive to a high SK signal (waveform 1317) from OR-gate 344.

The similarity signals for the selected templates in the dial state are stored in processor 503 and the most similar template is determined after the TN=TMAX template is processed. Assume, for purposes of illustration, that the user utters the name "Smith" and that the template for this name is selected as the most similar template by word recognition processor 503. The WC identification signal (waveform 1319) corresponding to "Smith" is returned to processor 210 along with a WRD recognition done signal (waveform 1321) at time $t_9$ via transfer control module 233. Upon detection of a name identification signal ($t_{10}$), processor 210 is switched to its verify state. Signals generated by the processor cause voice response circuit 180 to utter the phrases "I have recognized the name" followed by "Smith." After these messages are emitted by speaker 190 between times $t_{10}$ and $t_{13}$. VRD signals (waveform 1305) are then returned to processor 210. Analyzer 110 is thereby enabled for a short interval responsive to the RL=S and AE signals produced by processor 210 at time $t_{14}$. The user may then utter "error," or "stop." Any other utterance or silence produces a WC=0 verification signal.

In the verification state, the utterance feature signals of the short verify interval are compared to the restricted vocabulary defined by the TN=7 and TN=8 entries in command control ROM 320. As shown in FIG. 6 for the VER row, only the "stop" and "error" templates are retrieved from memory 120 during the verify mode for comparison with the contents of latch 501. Between $t_{16}$ and $t_{19}$, the sequence of TN address signals (waveform 1315) are produced by counter 507. Only the TN=7 and TN=8 address signals between times $t_{17}$ and $t_{18}$ are not skipped. Where the utterance "error" is recognized, the circuit of FIG. 1 is reset to the beginning of the dial mode after the message "Repeat the name" is produced by voice response circuit 180. The verify state WC identification signal and WRD recognition done signals occur between times $t_{19}$ and $t_{20}$ in FIG. 13. Recognition of "stop" resets the circuit of FIG. 1 to its rest state. Otherwise the circuit of FIG. 1 is advanced to its call state so that the dialing codes for the recognized name may be outpulsed from dialer pulse former 160.

In the call state, a directory address code corresponding to the recognized name identification signal WC (waveform 1319) between $t_{19}$ and $t_{20}$ is produced in processor 210. An RL=L signal and an AE signal are generated in processor 210 at time $t_{20}$. The directory store address (DA) and directory read (DRW) signals are applied to directory store 170 via directory control module 221 so that the directory number for "Smith" is retrieved from the directory store. The retrieved directory code is placed in directory control module 221 and responsive to the directory store done signal processor 210 transfers the directory code to dial pulse former 160 from dialer control module 223. Pulse former 160 is operative to generate the dialing signals corresponding to the name "Smith" and to provide the dialing signals to the telephone set 195.

Figure 13:
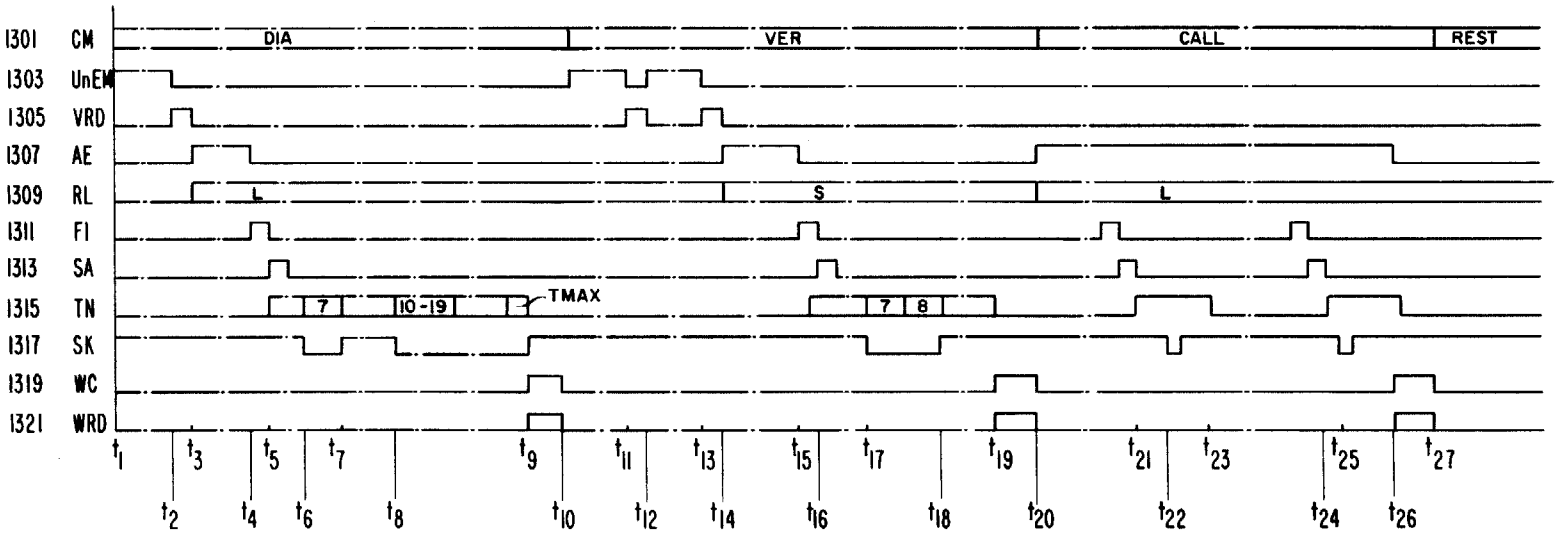

The circuit of FIG. 1 is then conditioned to recognize the command word "hang up" responsive to the CM=CALL command word applied to command control memory 320. Utterances are continually analyzed during the call state as indicated in FIG. 13 between times $t_{20}$ and $t_{26}$. In the call state, a low SK signal is obtained only for the "hang up" TN=9 template as shown in the call row of FIG. 6. The SK signal is low only at $t_{22}$ and $t_{25}$ in waveform 1317 of FIG. 13. When the WC identification signal for "hang up" is detected by processor 210 at time $t_{26}$, the circuit of FIG. 1 is reset to its rest mode.

If a digit rather than a name is recognized while the circuit of FIG. 1 is in its dial state, processor 210 is switched to its number state in which the CM=NUM command signal restricts the template selection to the digit templates TN=10 through TN=19 and the "stop" template TN=7. The sequence of digit utterances is recognized as described with respect to the directory mode and the WC identification signals for the recognized digits are stored in control memory 201.

The detection of the WRD recognition done signal for the last expected digit utterance in processor 210 causes the processor to generate an emit (EM) signal and a succession of utterance number $U_n$ signals. The utterance number signals correspond to the messages "I have recognized the number," the recognized digit sequence, "Please verify," and a tone. These phrases are generated by synthesizer 410 responsive to the spoken message coded signals in memory 430. Responsive to the fourth message complete (VRD) signal from synthesizer 410, processor 210 is switched into its verify state. Analyzer 110 is enabled by the AE and RL=S signals from processor 210 for short interval. The user utterance during this interval is converted into feature signals in analyzer 210. After the utterance feature signals are stored in latch 501, an FI feature generation complete signal is sent to processor 210.

Processor 210 detects the FI signal and generates a CM=VER command signal and an SA recognition start signal. These signals are stored in control modules 227 and 233, respectively. The SA signal resets counter 507 and enables word recognition processor 503 via flip-flop 510. The TN address signals from counter 507 are applied to comparator 310 and to command control module 320. The CM=VER signal is supplied to command control module 320 and template control module 330. As previously described, the template retrieval from template memory 120 is restricted to "stop" and "error." Any other utterance or silence is effective as a verification of the recognized sequence. Where the similarity signal obtained for the "stop" template feature signals is better than the similarity signal for "error" and within a predetermined range, the WC identification signal corresponding thereto is supplied to processor 210. Processor 210 is reset to its rest mode. Return of a WC identification for "error," switches processor 210 back to the initial phase of the dial mode after a message to repeat the number is generated in voice response circuit 180.

User verification of the recognized number results in a WC=0 signal being detected by processor 210. The processor is then conditioned to convert the stored recognized digit codes into directory codes which are supplied to dialer pulse former 160 via control module 223. The dialing signals obtained from pulse former 160 are transmitted to telephone instrument 195 and the telephone call is initiated. Upon completion of the telephone connection, processor 210 is placed in its call mode and conditioned to detect the WC identification signal for "hang up." All utterances are converted into feature signals. Recognition processor 503 is conditioned to supply a WC signal corresponding to "hang up" to the processor when the prescribed degree of similarity is obtained. Only the template feature signals for "hang up" are retrieved responsive to the command word signal CM=CALL supplied to command control memory 320.

While the invention has been shown and described with reference to particular embodiments thereof, it is understood that various modifications may be made by those skilled in the art without departing from the spirit and scope of the invention.

CONTROLLER APPENDIX A

```
C MAIN PROGRAM
    INPUT "INSTALLER INITIALIZATION"
    MT=(MANUAL CONTROL)
    IF(INSTALLER INIT) GOTO 200
100 CONTINUE
    CALL REST
    GOTO 100
C
C INSTALLER INITIALIZATION FIRST TRAINING
C
200 CONTINUE
    CALL TRAIN
    GOTO 100
    END
    SUBROUTINE REST
    DATA L1/LONG INTERVAL
    DATA L2/SHORT INTERVAL
C SET RECORD LENGTH
100 CONTINUE
    OUTPUT(RECORD LENGTH) RL=L1
    OUTPUT(MODE CONTROL) CM=REST
150 CONTINUE
C
```

```
C WAIT FOR RECOGNIZER OUTPUT
C
      CALL RECOGNIZER(WC)
      INPUT WORD=WC
      IF(WORD.EQ.0) GOTO 100;NO WORD RECOGNIZED
      GOTO (301, 302, 303), WORD
C
301   CALL OFFHOOK
      GOTO 100
302   CALL DIRECTORY
      GOTO 100
303   CALL TRAIN
      GOTO 100
C
      END
      SUBROUTINE DIRECTORY
      COMMON/TEMP/NUMBER(NDIG), NDIG
C SET RECORD LENGTH AND CONTEXT
C
100   CONTINUE
      OUTPUT(RECORD LENGTH) RL=L1; (LONG INTERVAL)
      OUTPUT(MODE CONTROL) CM=DIRECTORY
C     WAIT FOR RECOGNITION
      CALL RECOGNIZER(WC)
      INPUT WORD=WC
C
      IF(WORD.EQ.0) CALL OUTPH(PH4)  ; REPEAT COMMAND
      IF(WORD.EQ.0) GOTO 100
      IF(WORD.EQ.7) RETURN     ; STOP RECOGNIZED
      IF(WORD.EQ.4) GOTO 1000 ; ADD
      IF(WORD.EQ.5) GOTO 2000  ; DELETE
C     WORD=6, MODIFY RECOGNIZED
      CALL OUTPH(PH0)  ; ENTER NAME TO BE MODIFED
200   OUTPUT(RECORD LENGTH) RL=L1; (LONG INTERVAL)
      OUTPUT(MODE CONTROL) CM=NAME
C     WAIT FOR RECOGNIZER
      CALL RECOGNIZER(WC)
      INPUT WORD=WC
      IF(WORD.EQ.0) CALL OUTPH(PH4)  ; PLEASE REPEAT
      IF(WORD.EQ.0) GOTO 200
      IF(WORD.EQ.7) RETURN        ; STOP RECOGNIZED
C     NAME RECOGNIZED
      CALL OUTPH(PH2)    ; OUTPUT PHRASE
      CALL OUTNAM(WORD)  ; OUTPUT NAME
      NAME=WORD       ; SAVE NAME FOR USE
      CALL VERIFY(STATUS)
      IF(STATUS.EQ.0) CALL OUTPH(PH4)  ; REPEAT
      IF(STATUS.EQ.0) GOTO 200
      IF(STATUS.EQ.2) RETURN    ; STOP RECOGNIZED
C     STATUS=1, INPUT CORRECT
      CALL OUTPH(PH3) ; OUTPUT PHRASE
300   CALL OUTPUT(RECORD LENGTH) RL=L1; (LONG INTERVAL)
      CALL OUTPUT(MODE CONTROL) CM=NUMB
C     WAIT FOR RECOGNIZER
      DO 400 I=1,NDIG
      CALL RECOGNIZER(WC)
```

```
      INPUT WORD=WC
      IF(WORD.EQ.0) CALL OUTPH(PH4)  ; PLEASE REPEAT
      IF(WORD.EQ.0) GOTO 300
      IF(WORD.EQ.7) RETURN        ; STOP RECOGNIZED
      NUMBER(I)=WORD
400   CONTINUE
      CALL OUTPH(PH1)   ; OUTPUT PHRASE
      CALL OUTNUM       ; OUTPUT NUMBER
      CALL VERIFY(STATUS)
      IF(STATUS.EQ.0) CALL OUTPH(PH4);ERROR IN INPUT REPEAT
      IF(STATUS.EQ.0) GOTO 300
      IF(STATUS.EQ.2) RETURN                ; STOP RECOGNIZED
C     NUMBER IS CORRECT   ; UPDATE DIRECTORY STORE
      OUTPUT(DIRECTORY CONTROL) DA=NAME  DRW=WRITE, DC=NUMBER
      WAIT (DIRECTORY CONTROL) DSD
      RETURN
C
C     ADD_RECOGNIZED
1000  OUTPUT(MODE CONTROL) CM=NAME
       CALL OUTPH(PH5)   ; ENTER NAME TO BE ADDED
       OUTPUT(VOICE RESPONSE CONTROL)RE/EM=RECORD UN=NEWNAME
C      RECORD AND STORE DIRECTORY
       WAIT (VOICE RESPONSE CONTROL) VRD
C
C RECORD AND STORE TEMPLATE FOR NEW NAME
      OUTPUT(RECORD TEMPLATE CONTROL) TRW
C ENTER PHONE NUMBER FOR ADDED NAME
      CALL OUTPH(PH6)  ; PHRASE OUTPUT - ENTER NUMBER
      GOTO 300
C
C DELETE_RECOGNIZED
C
2000  CONTINUE
       CALL OUTPH(PH8)    ; ENTER NAME TO BE DELETED
700    OUTPUT(RECORD LENGTH) RL=L1 ; LONG INTERVAL
       OUTPUT(MODE CONTROL) CM=NAME
C
C      WAIT FOR RECOGNIZER
C
       CALL RECOGNIZER (WC)
       INPUT WORD=WC
       IF(WORD.EQ.0) CALL OUTPH(PH4)   ; REPEAT
       IF(WORD.EQ.0) GOTO 700
       IF(WORD.EQ.7) RETURN   ; STOP RECOGNIZED
C      NAME RECOGNIZED, OUTPUT IT
       CALL OUTPH(PH2)
       CALL OUTPH(WORD)
       CALL VERIFY(STATUS)
       IF(STATUS.EQ.0) CALL OUTPH(PH4)   ; ERROR FOUND
       IF(STATUS.EQ.0) GOTO 700
       IF(STATUS.EQ.2) RETURN    ; STOP RECOGNIZED
C      NAME CORRECT - DELETE FROM DIRECTORY
       OUTPUT(DIRECTORY CONTROL) DA=WORD DRW=WRITE DC=JUNK
       RETURN
       END
       SUBROUTINE OFFHOOK
C
```

```
      COMMON/TEMP/NUMBER(NDIG), NDIG
      DATA NDIG/4/
C  SET RECORD LENGTH AND CONTEXT
100   OUTPUT(RECORD LENGTH) RL=L1 ; LONG INTERVAL
      OUTPUT(MODE CONTROL)CM=DIAL
C
C    WAIT FOR RECOGNIZER OUTPUT
C
      CALL RECOGNIZER(WC)
      INPUT WORD=WC
C
      IF(WORD.EQ.0) CALL OUTPH(PH4)    ; REPEAT
      IF(WORD.EQ.0) GOTO 100
      IF(WORD.EQ.7) RETURN     ; STOP RECOGNIZED
      IF(WORD.GE.20) GOTO 2000  ; NAME RECOGNIZED
C    RECOGNIZED NUMBER
      NUMBER(1)=WORD
      OUTPUT(MODE CONTROL)CM=NUMB
C    WAIT FOR RECOG. OF REMAINING NUMBER SEQUENCE
      DO 200 J=2,NDIG
      CALL RECOGNIZER(WC)
      INPUT WORD=WC
      IF(WORD.EQ.0) CALL OUTPH(PH4)  ; REPEAT
      IF(WORD.EQ.0) GOTO 100
      IF(WORD.EQ.7) RETURN; STOP RECOGNIZED
      NUMBER(J)=WORD
200   CONTINUE
      CALL OUTPH(PH1)  ; OUTPUT PHRASE
      CALL OUTNUM     ; OUTPUT NUMBER
      CALL VERIFY(STATUS); VERIFY RECOGNITION
C
      IF(STATUS.EQ.0) CALL OUTPH(PH4)    ; REPEAT
      IF(STATUS.EQ.0) GOTO 100
      IF(STATUS.EQ.2) RETURN             ; STOP RECOGNIZED
C    CORRECT DIGIT STRING-DIAL NUMBER
      CALL DIALN
      RETURN
C
C    NAME RECOGNIZED
C
2000  CONTINUE
      NAME=WORD
      CALL OUTPUT(PH2)    ; OUTPUT PHRASE
      CALL OUTNAM(NAME)   ; OUTPUT NAME
      CALL VERIFY(STATUS)
      IF(STATUS.EQ.0) CALL OUTPH(PH4)  ; REPEAT
      IF(STATUS.EQ.0) GOTO 100
      CALL LOOKUP(NAME)      ; LOOKUP NUMBER AND DIAL
      RETURN
      END
      SUBROUTINE TRAIN
C
C  TRAINING OF SYSTEM
C
      DO 100 I=1,19
      OUTPUT (RECORD TEMPLATE CONTROL) RTW=I, TRW=WRITE
      CALL OUTPH(PHF) ; OUTPUT PHRASE
```

```
      CALL OUTPH(I)    ; OUTPUT WORD
      WAIT(RECORD LENGTH) FI
100   CONTINUE
      RETURN
      END
      SUBROUTINE OUTPH(IDUMMY)
C
C  OUTPUT PHRASE NUMBER IDUMMY FROM
C  VOICE RESPONSE UNIT
C
      OUTPUT(VOICE RESPONSE CONTROL)UN=IDUMMY
      OUTPUT(VOICE RESPONSE CONTROL) RE/EM=EMIT
      WAIT(VOICE RESPONSE CONTROL) VRD
      RETURN
      END
      SUBROUTINE OUTNUM
C  OUTPUT NUMBER IN COMMON ARRAY "NUMBER"
      COMMON/TEMP/NUMBER(NDIG), NDIG
      DO 100 J=1,NDIG
      CALL OUTPH(NUMBER(J))
100   CONTINUE
      RETURN
      END
      SUBROUTINE OUTNAM(NAME)
C  OUTPUT NAME RECOGNIZED
      CALL OUTPH(NAME)
      RETURN
      END
      SUBROUTINE DIALN
C
C  DIAL NUMBER AND MAKE CONNECTION
C
      COMMON/TEMP/NUMBER(NDIG), NDIG
      DO 100 I=1,NDIG
      OUTPUT(DIALER CONTROL) DC=NUMBER(I)
      CONTINUE
      CALL HANGUP
      RETURN
      END
      SUBROUTINE HANGUP
C
C  CHECK FOR HANGUP COMMAND
C  AFTER A CALL HAS BEEN COMPLETED
C
100 OUTPUT(RECORD LENGTH) RL=L1  ; LONG INTERVAL
    OUTPUT(MODE CONTROL) CM=CALL
C   WAIT FOR RECOGNITION
    CALL RECOGNIZER(WC)
    INPUT WORD=WC
C
C   CHECK FOR HANGUP
C
    IF(WORD.NE.9) GOTO 100
    RETURN
    END
    SUBROUTINE RECOGNIZER(WORDCODE)
```

```
C
C  RECOGNITION ROUTINE
C
     WAIT(RECORD LENGTH) FI
     OUTPUT(TRANSFER CONTROL)SA
     WAIT(TRANSFER CONTROL)WRD
     INPUT(TRANSFER CONTROL)WORDCODE=WC
     RETURN
     END
     SUBROUTINE VERIFY(STATUS)
C
C  CHECK IN COMMAND RECOGNIZED IS CORRECT
C
     OUTPUT(RECORD LENGTH)RL=L2;(SHORT INTERVAL)
     OUTPUT(MODE CONTROL)CM=VERIFY
C
C  WAIT FOR RECOGNIZER OUTPUT
C
     CALL RECOGNIZER(WC)
     INPUT WORD=WC
     IF(WORD.EQ.0) GOTO 1000
     IF(WORD.EQ.7) GOTO 2000
     STATUS=0  ; ERROR RECOGNIZED
     RETURN
1000 CONTINUE
     STATUS=1 ; NO WORD RECOGNIZED INPUT IS CORRECT
     RETURN
2000 CONTINUE
     STATUS=2 ; STOP RECOGNIZED
     RETURN
     END
     SUBROUTINE LOOKUP(NAME)
     COMMON/TEMP/NUMBER(NDIG), NDIG
C
C  LOOKUP PHONE NUMBER FOR NAME
C
     OUTPUT(DIRECTORY CONTROL)DA=NAME DRW=READ
     WAIT(DIRECTORY CONTROL)DSD
     INPUT NUMBER=DC
     CALL DIALN
     RETURN
     END
     PHRASE LIST
     NUMBER          PHRASE
      1-19          <AS PER FIGURE 6>
      PHO           PLEASE ENTER NAME TO BE MODIFIED
      PH1           I HAVE RECOGNIZED THE NUMBER
      PH2           I HAVE RECOGNIZED THE NAME
      PH3           ENTER NEW PHONE NUMBER
      PH4           PLEASE REPEAT THE COMMAND
      PH5           SPEAK THE NAME TO BE ADDED
      PH6           PLEASE ENTER PHONE NUMBER
      PH7           SPEAK WORD
```

```
PHO        PLEASE SPEAK NAME TO BE DELETED
20)        <NAME1>
           <NAME2>
 n)        <NAMEn>
           RETURN
           END
```

We claim:

1. A spoken word controlled repertory dialing circuit comprising:

a memory for storing a plurality of template signals representative of the acoustic features of reference words including command words and repertory words;

a directory store for storing a set of dialing signals corresponding to said repertory words;

a speech analyzer responsive to each input spoken word utterance for forming acoustic feature signals representative of said utterance;

a spoken word recognizer jointly responsive to said input spoken word utterance acoustic feature signals from said speech analyzer and template signals from said memory for generating a signal identifying said input utterance;

means responsive to the input utterance identifying signal corresponding to a repertory word template for retrieving the corresponding dialing signal from said directory store;

and means responsive to each occurring input utterance identifying signal for selecting a predetermined set of template signals to identify the next occurring input utterance.

2. A spoken word controlled repertory dialing circuit according to claim 1 further comprising means jointly responsive to a command word utterance identifying signal and the next occurring utterance identifying signal corresponding to other than one of the predetermined set of template signals selected for said command word utterance identification signal for reselecting said predetermined set of template signals selected by said command word utterance identifying signal to identify the utterance immediately succeeding said next occurring utterance.

3. A spoken word controlled repertory dialing circuit according to claim 2 wherein said template selecting means further comprises means responsive to a repertory word utterance identifying signal for enabling said speech analyzer to receive utterance signals for a preselected time interval; and means responsive to said repertory word identifying signal for gating a predetermined set of said preselected time interval word template signals to said spoken word recognizer to generate an identifying signal for said preselected interval utterance; and said dialing signal retrieving means comprises means responsive to said preselected interval utterance identifying signal corresponding to other than one of said set of preselected time interval word template signals for retrieving the dialing signal corresponding to said repertory word identifying signal from said directory store.

4. A spoken word controlled dialing circuit according to claim 3 wherein said speech analyzer is responsive to a sequence of utterances of isolated words by a speaker for generating a set of isolated word template signals including command word and repertory word template signals, and said spoken word recognizer comprises means for inserting the isolated word template signals into said template memory as said template signals whereby the spoken word dialing circuit is sensitive only to isolated utterances of said reference words.

5. A spoken word controlled repertory dialing circuit according to claims 1, 2, 3, or 4 wherein said template signal selecting means comprises:

means responsive to each first occurring utterance identifying signal from said spoken word recognizer for generating a control signal corresponding thereto;

means responsive to the generation of the acoustic feature signals occurring immediately after each of said first occurring utterance identifying signals for producing signals to address the template signals in said template memory;

and means jointly responsive to said utterance identifying control signals and said template memory addressing signals for applying only a predetermined set of template signals to said spoken word recognizer for identifying said acoustic feature signals.

6. A spoken word controlled repertory dialing circuit according to claim 5 wherein said means to address the template signals in said template memory comprises means responsive to the generation of the next occurring utterance acoustic feature signals for sequentially generating said template memory addressing signals for all template signals in said memory;

said predetermined template signal applying means comprises means for storing a set of gating signals for each utterance identification control signal, means jointly responsive to said control signal and each template addressing signal for retrieving a selected gating signal from said gating signal storing means, and means responsive to said selected gating signals for transferring said predetermined template signals from said template memory to said spoken word recognizer.

7. In a spoken work controlled repertory dialing circuit comprising a memory for storing a plurality of template signals representative of the acoustic features of reference words including command words and repertory words, a directory store for storing a plurality of dialing signals corresponding to said repertory words, a speech analyzer, and a spoken word recognizer;

the method of outputting dialing signals responsive to input utterances comprising the steps of generating a set of acoustic feature signals for each input utterance in said speech analyzer;

identifying each input utterance as a reference word in said spoken word recognizer jointly responsive to template signals from said memory and said input utterance acoustic feature signals from said speech analyzer;

retrieving dialing signals from said directory store responsive to each repertory word utterance identifying signal; and responsive to each occurring input utterance identifying signal, selecting only a predetermined set of template signals for identifying the next occurring input utterance.

8. In a spoken word controlled repertory dialing circuit comprising a memory for storing a plurality of template signals representative of reference words including command words and repertory words, a directory store for storing a plurality of dialing signals corresponding to said repertory words, a speech analyzer, and a spoken word recognizer; the method of outputting dialing signals responsive to input utterances according to claim 7 wherein said template signal selecting step further comprises generating a first signal responsive to each command word utterance identification signal; and, jointly responsive to said first signal and the next occurring utterance identifying signal corresponding to other than one of the predetermined set of template signals selected by said command word utterance identifying signal, reselecting the predetermined set of template signals selected by said command word utterance identifying signal to identify the utterance immediately succeeding said next occurring utterance.

9. In a spoken word controlled repertory dialing circuit comprising a memory for storing a plurality of template signals representative of the acoustic features of reference words including command words and repertory words, a directory store for storing a plurality of dialing signals corresponding to said repertory words, a speech analyzer, and a spoken word recognizer;

the method of outputting dialing signals responsive to input utterances according to claim 8 wherein said template signal selecting further comprises enabling said speech analyzer to receive utterances for a preselected time interval responsive to a repertory word utterance identifying signal, and gating a predetermined set of preselected time interval template signals to said spoken word recognizer to identify the next occurring utterance, and the dialing signal retrieving further comprises retrieving the dialing signals corresponding to the repertory word utterance identifying signal from said directory store responsive to said next occurring utterance identifying signal corresponding to other than one of said predetermined set of preselected time interval template signals.

10. In a spoken word controlled repertory dialing circuit comprising a memory for storing a plurality of template signals representative of the acoustic feature signals of reference words including command words and repertory words, a directory store for storing a plurality of dialing signals corresponding to said repertory words, a speech analyzer, and a spoken word recognizer; the method of outputting dialing signals responsive to input utterances according to claim 9 wherein said acoustic feature signal generating step comprises generating a set of isolated word template signals responsive to a sequence of isolated utterances by a speaker including isolated command word and repertory word template signals; and said input utterance identifying step comprises inserting the isolated word template signals into said template memory as said template signals whereby said spoken word dialing is sensitive only to isolated utterances of said reference words.

11. In a spoken word controlled repertory dialing circuit comprising a memory for storing a plurality of template signals representative of the acoustic features of reference words including repertory words; a directory store for storing a plurality of dialing signals corresponding to said repertory words, a speech analyzer, and a spoken word recognizer;

the method of outputting dialing signals responsive to input utterances according to claim 7, 8, 9 or 10 wherein the predetermined template signal selecting step comprises generating a control signal corresponding to each first occurring utterance identifying signal;

generating signals to address template signals in said template memory responsive to the generation of the acoustic feature signals occurring immediately after each of said first occurring utterance identifying signals;

and applying only said predetermined template signals to said spoken word recognizer to identify said acoustic feature signals jointly responsive to said utterance identifying control signals and said template memory addressing signals.

12. In a spoken word controlled repertory dialing circuit comprising a memory for storing a plurality of template signals representative of the acoustic features of reference words including repertory words, a directory store for storing a plurality of dialing signals corresponding to said repertory words, a speech analyzer, and a spoken word recognizer;

the method of outputting dialing signals responsive to input utterances according to claim 11 wherein said template addressing signal generating step comprises sequentially generating template addressing signals for all template signals in said template memory; said predetermined template signal applying step comprises storing a set of gating signals for each control signal; and jointly responsive to each utterance identifying control signal and each template addressing signal, applying the gating signal corresponding to the template addressing signal and the utterance identifying control signal to said word recognizer to gate only the predetermined template signals to said word recognizer to identify the next occurring input utterance.

13. A spoken word controlled repertory dialer comprising a memory for storing a plurality of template signals representative of the acoustic features of isolated reference word utterances including a set of isolated command word utterance feature signals and a set of isolated repertory name utterance feature signals;

a directory store for storing a set of dialing signals corresponding to said set of isolated repertory name utterance feature signals;

a speech analyzer responsive to each input utterance for forming acoustic feature signals representative of the input utterance;

a spoken word recognizer jointly responsive to said input spoken word utterance feature signals from said speech analyzer and template signals from said template memory for identifying the input utterance as one of said isolated reference word template signals;

means responsive to the input utterance identifying signal corresponding to a repertory name for retrieving the dialing signal for said repertory name from said directory store;

and means responsive to each occurring input utterance identifying signal for applying a predetermined set of isolated word template signals to said spoken word recognizer to identify the next occurring utterance.

14. A spoken word controlled repertory dialer according to claim 13 further comprising means responsive to a repertory name utterance identification signal from said spoken word recognizer for enabling said speech analyzer to receive an input utterance for a preselected interval; and said template signal selecting means comprises means for gating a set of preselected interval isolated word template signals to said spoken word recognizer to identify said preselected interval input utterance, and said dialing signal retrieval means comprises means responsive to said preselected interval input utterance identifying signal corresponding to other than one of said preselected time interval isolated word template signals for retrieving the dialing signal corresponding to said repertory name identifying signal from said directory store.

15. A spoken word controlled repertory dialer according to claim 14 further comprising means jointly responsive to a command word utterance identification signal and the next occurring utterance identifying signal corresponding to other than one of the predetermined set of isolated template signals selected for said command word utterance identification signal for reselecting said predetermined set of isolated word template signals selected for said command word utterance identification signal to identify the input utterance immediately succeeding said next occurring input utterance.

16. A spoken word controlled repertory dialer according to claims 13, 14, or 15 wherein said predetermined template signal applying means includes means responsive to each utterance identification signal for generating a template group selection signal correponding thereto;

means for storing a set of gating signals for each template group selection signal;

means responsive to the next occurring input utterance feature signals for producing a sequence of signals to address all template signals in said template memory; means jointly responsive to said utterance corresponding template group selection signal and said template memory address signals for retrieving a selected gating signal from said gating signal storing means; and means responsive to said selected gating signals for transferring only said predetermined set of isolated word template signals from said template memory to said spoken word recognizer.

*17. A voice responsive repertory dialing circuit comprising:*

*a memory for storing a plurality of template signals representative of the acoustic features of reference words including repertory words;*

*a directory store for storing a set of dialing signals corresponding to said repertory words;*

*a speech analyzer responsive to each input spoken word utterance for forming acoustic feature signals representative of said utterance;*

*a spoken word recognizer jointly responsive to said input spoken word utterance acoustic feature signals from said speech analyzer and template signals from said memory for generating a signal identifying said input utterance;*

*means responsive to the input utterance identifying signal corresponding to a repertory word template for retrieving the corresponding dialing signal from said directory store; and*

*means responsive to each occurring input utterance identifying signal for selecting at least one template signal to identify the next occurring input utterance.*

*18. A voice responsive repertory dialing circuit comprising:*

*a memory for storing a plurality of template signals representative of the acoustic features of reference words including repertory words;*

*a directory store for storing a set of dialing signals corresponding to said repertory words;*

*a speech analyzer responsive to each input spoken word utterance for forming acoustic feature signals representative of said utterance;*

*a spoken word recognizer jointly responsive to said input spoken word utterance acoustic feature signals from said speech analyzer and template signals from said memory for generating a signal identifying said input utterance;*

*means responsive to the input utterance identifying signal corresponding to a repertory word template for retrieving the corresponding dialing signal from said directory store;*

*and means responsive to other than repertory word template input utterance identifying signals for selecting at least one template signal to identify the next occurring input utterance.*

* * * * *